US008699131B2

(12) United States Patent
Shirota et al.

(10) Patent No.: US 8,699,131 B2
(45) Date of Patent: Apr. 15, 2014

(54) MICROSCOPE CONTROLLER AND MICROSCOPE SYSTEM COMPRISING MICROSCOPE CONTROLLER

(75) Inventors: Tetsuya Shirota, Tokyo (JP);
Katsuyoshi Yamaguchi, Tokyo (JP);
Minoru Sukekawa, Tokyo (JP)

(73) Assignee: Olympus Corporation, Tokyo (JP)

( * ) Notice: Subject to any disclaimer, the term of this patent is extended or adjusted under 35 U.S.C. 154(b) by 629 days.

(21) Appl. No.: 12/956,537

(22) Filed: Nov. 30, 2010

(65) Prior Publication Data
US 2011/0134517 A1 Jun. 9, 2011

(30) Foreign Application Priority Data

Dec. 4, 2009 (JP) .................................. 2009-276055

(51) Int. Cl.
*G02B 21/00* (2006.01)
(52) U.S. Cl.
USPC .......................................... 359/381; 359/368
(58) Field of Classification Search
USPC .................................................. 358/368, 381
See application file for complete search history.

(56) References Cited

U.S. PATENT DOCUMENTS

| 5,877,751 | A | * | 3/1999 | Kanemitsu et al. ............ 345/173 |
| 2004/0190129 | A1 | * | 9/2004 | Peter et al. ..................... 359/368 |
| 2005/0041282 | A1 | | 2/2005 | Rudolph et al. |
| 2007/0103433 | A1 | * | 5/2007 | Katz ............................... 345/156 |
| 2008/0144170 | A1 | | 6/2008 | Takahashi |
| 2008/0155452 | A1 | | 6/2008 | Mizusawa |
| 2009/0259960 | A1 | | 10/2009 | Steinle et al. |
| 2009/0271723 | A1 | | 10/2009 | Matsushima et al. |
| 2010/0017732 | A1 | | 1/2010 | Matsushima et al. |
| 2010/0253486 | A1 | * | 10/2010 | Sato et al. ................. 340/407.2 |

FOREIGN PATENT DOCUMENTS

| EP | 1 445 635 A2 | 8/2004 |
| EP | 2 108 328 A1 | 10/2009 |
| JP | 2000-187547 A | 7/2000 |
| JP | 2002-281365 A | 9/2002 |
| JP | 2002-351618 A | 12/2002 |
| JP | 2005-331889 A | 12/2005 |

(Continued)

OTHER PUBLICATIONS

Extended European Search Report (EESR) dated Apr. 5, 2011 (in English) in counterpart European Application No. 10015093.7.

(Continued)

*Primary Examiner* — Sath V Perungavoor
*Assistant Examiner* — Jeffery Williams
(74) *Attorney, Agent, or Firm* — Holtz, Holtz, Goodman & Chick, PC

(57) ABSTRACT

In a microscope controller by which is performed an operation for controlling an operation of each of a plurality of electric units included in a microscope system, the control unit establishes a plurality of functional areas in the display region of the touch panel as regions for making operable the plurality of electric units. When an input to any of the functional areas is detected, the control unit generates a control instruction signal for controlling an electric unit corresponding to this functional area. The communication control unit transmits the control instruction signal to an external device controlling an operation of a corresponding electric unit. When an input to a predetermined functional area is detected, the control unit then reestablishes a plurality of functional areas within the display region of the touch panel so as to enlarge this functional area or a plurality of specific functional areas including this functional area.

19 Claims, 40 Drawing Sheets

(56) References Cited

FOREIGN PATENT DOCUMENTS

| | | | |
|---|---|---|---|
| JP | 2008-158379 A | 7/2008 | |
| JP | 2008-292578 A | 12/2008 | |
| JP | 4244068 B1 | 3/2009 | |
| WO | WO 96/18924 A1 | 6/1996 | |

OTHER PUBLICATIONS

Japanese Office Action dated Nov. 19, 2013 (and English translation thereof) in counterpart Japanese Application No. 2009-276055.

* cited by examiner

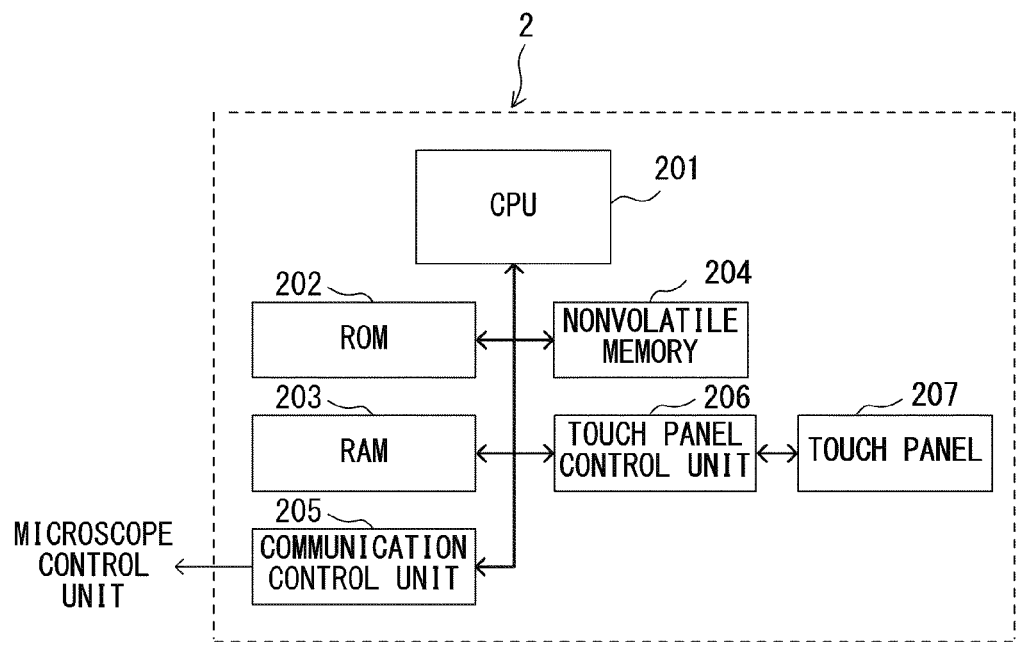
F I G. 2

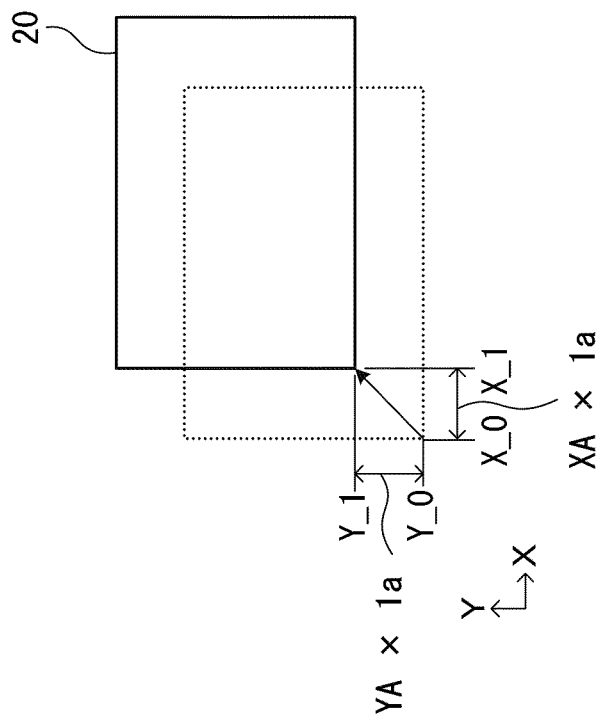
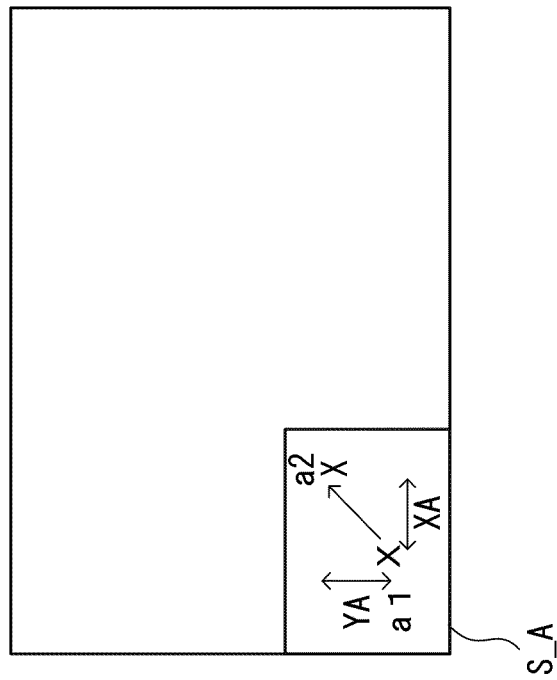
FIG. 8A
FIG. 8B

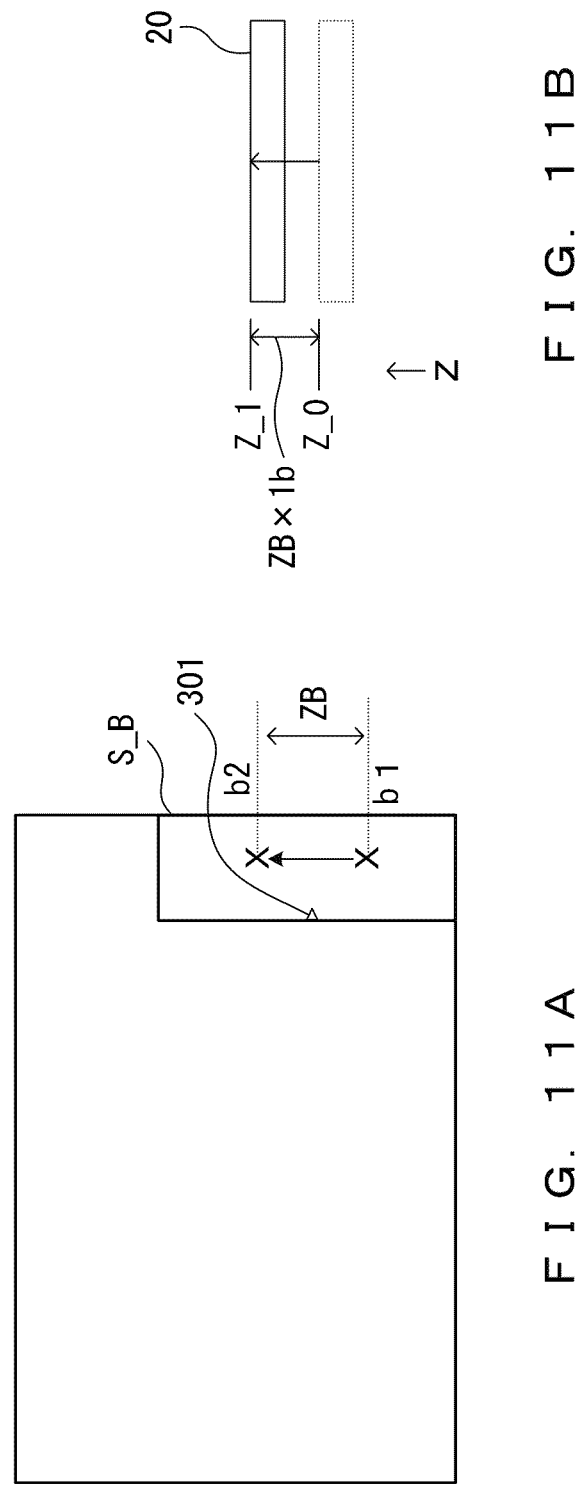

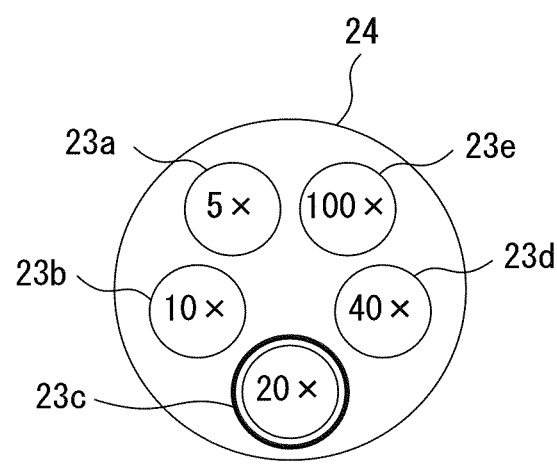
F I G. 1 3 B

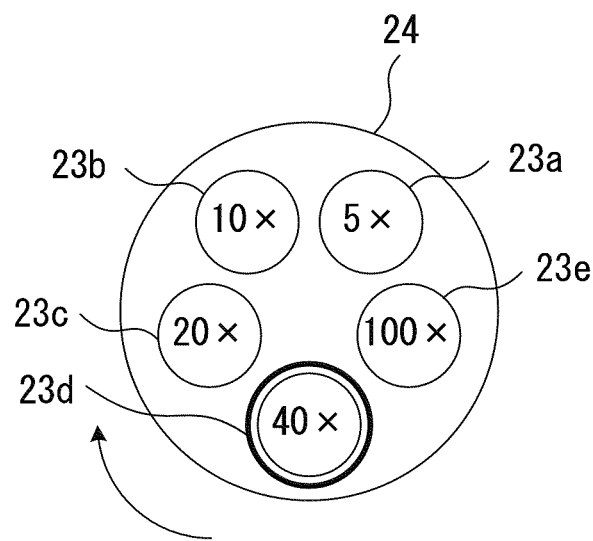
F I G. 1 4 B

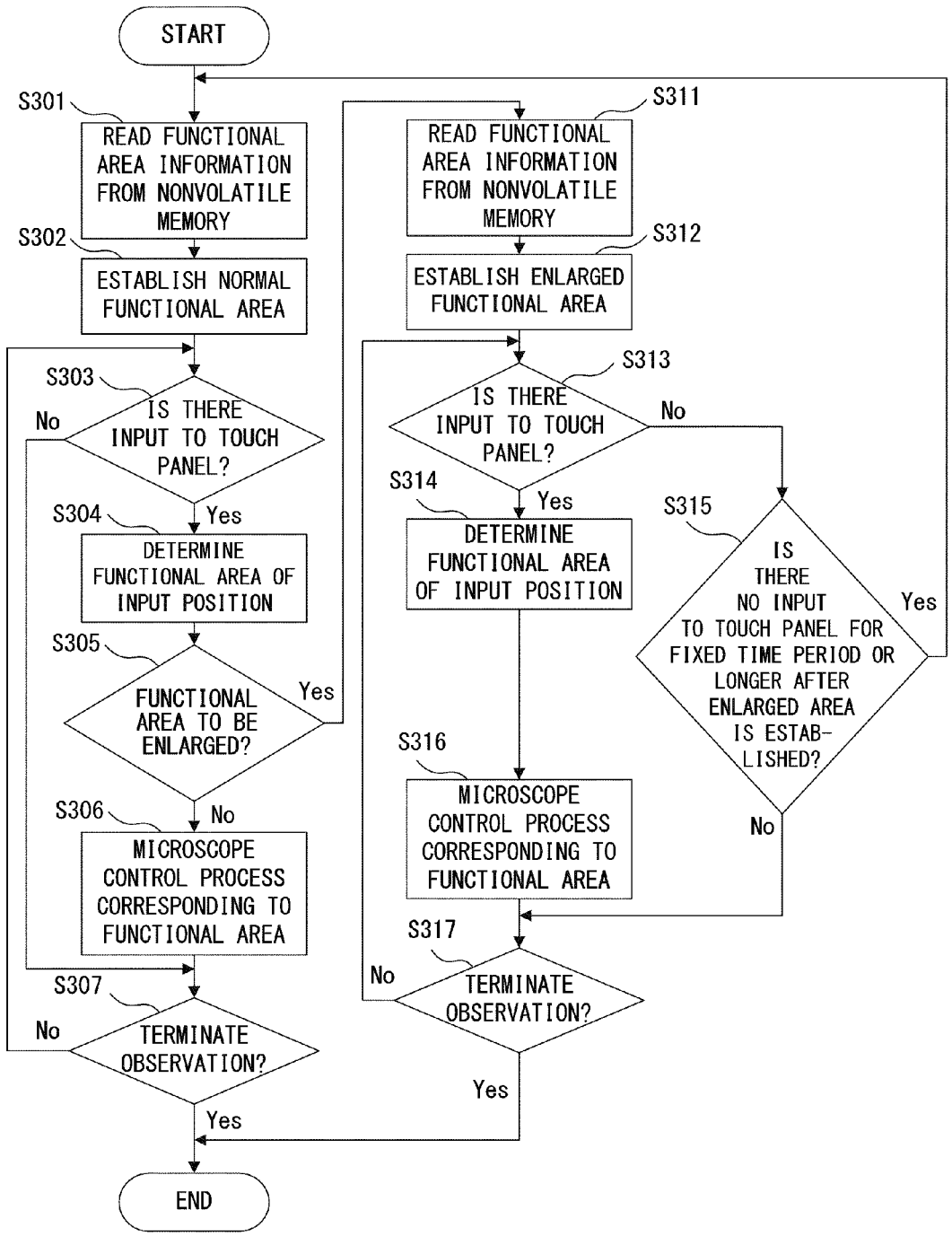
F I G. 1 6

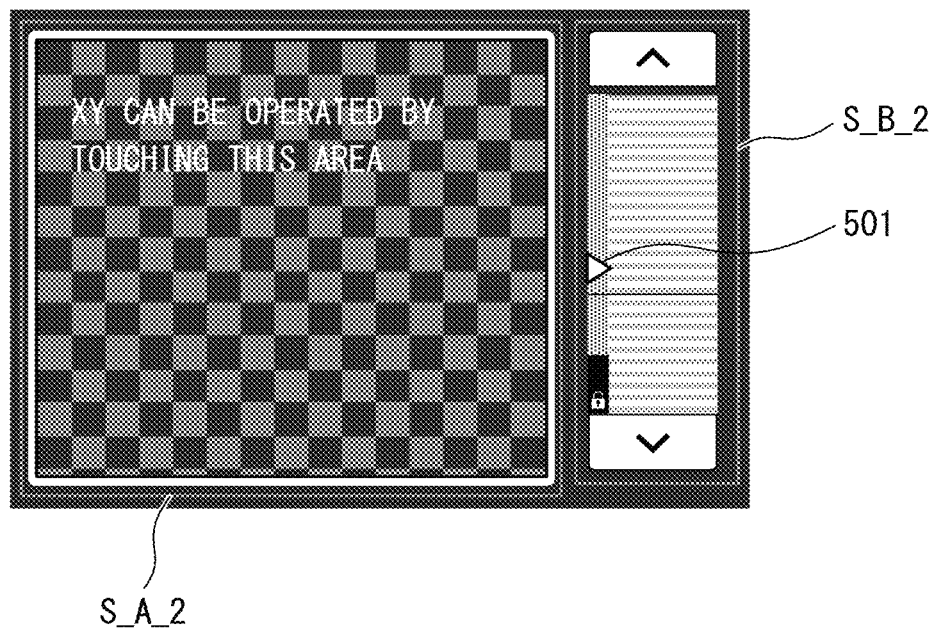
F I G. 17

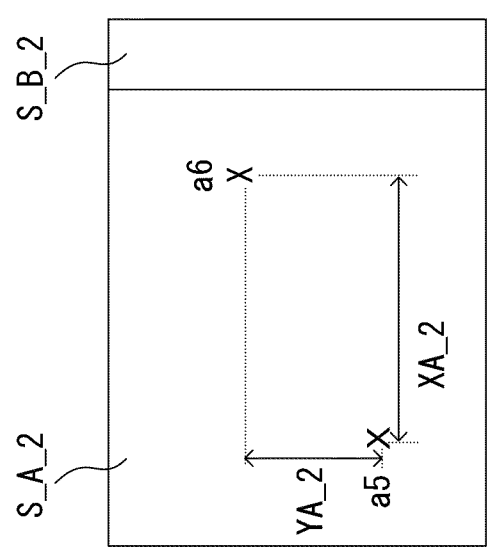
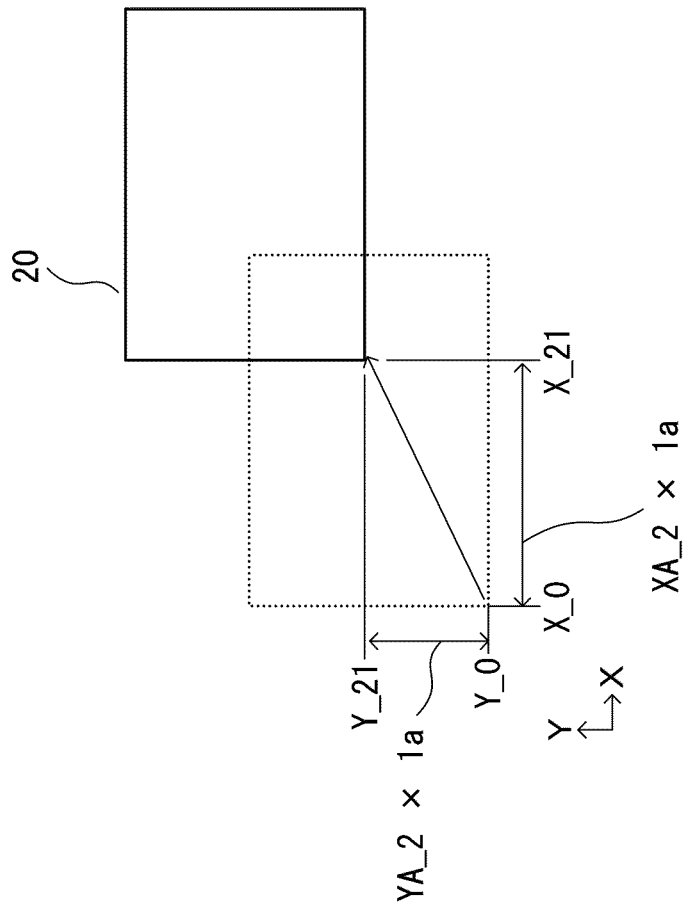
FIG. 18A
FIG. 18B

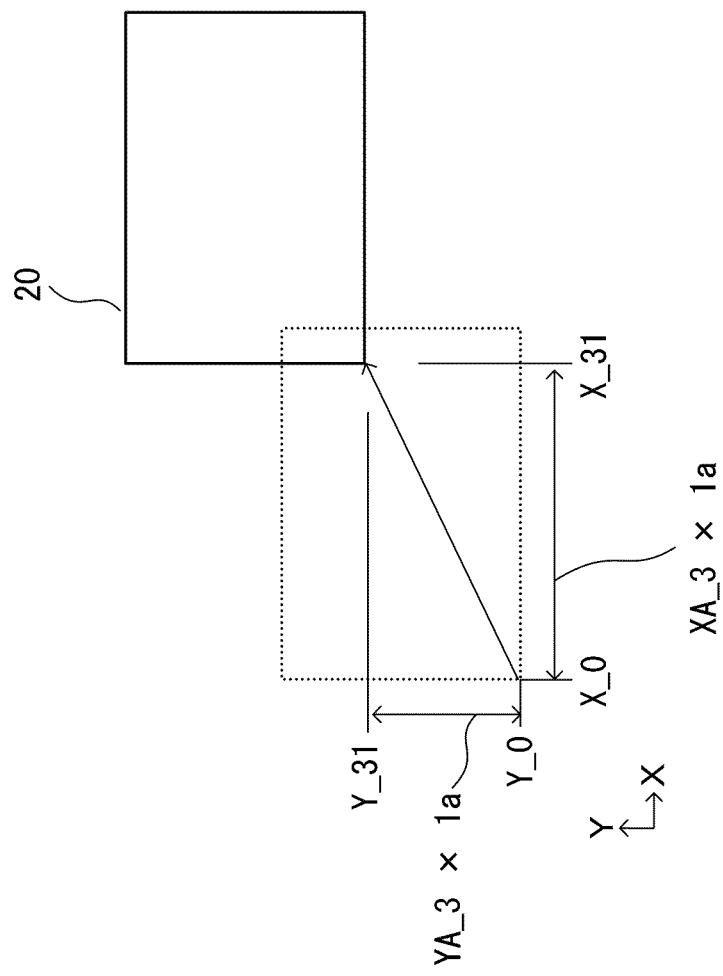
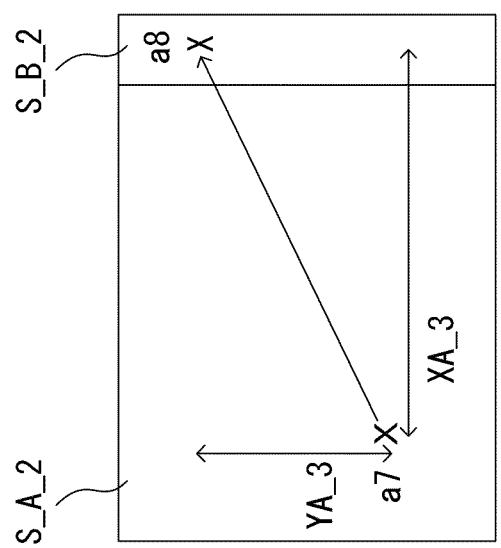
FIG. 20A
FIG. 20B

| ID | INPUT AREA | TOUCH PANEL INPUT SPECIFIC OPERATION | DRIVEN PART | CONTROL TO BE PERFORMED | ON/OFF |
|---|---|---|---|---|---|
| ID01 | S_A_2 | TRACE CIRCLE IN CLOCKWISE DIRECTION WITHIN FIXED TIME PERIOD T1 | ELECTRIC REVOLVER | SWITCH TO HIGH MAGNIFICATION | ON |
| ID02 | S_A_2 | TRACE CIRCLE IN COUNTERCLOCKWISE DIRECTION WITHIN FIXED TIME PERIOD T1 | ELECTRIC REVOLVER | SWITCH TO LOW MAGNIFICATION | ON |
| ID03 | SS_1 | TOUCH SAME PLACE TWO TIMES CONSECUTIVELY WITHIN FIXED TIME PERIOD T2 | ELECTRIC REVOLVER | SWITCH TO HIGH MAGNIFICATION | ON |
| ID04 | SS_2 | TOUCH SAME PLACE TWO TIMES CONSECUTIVELY WITHIN FIXED TIME PERIOD T2 | ELECTRIC REVOLVER | SWITCH TO LOW MAGNIFICATION | ON |
| ID05 | SS_3 | TOUCH SAME PLACE TWO TIMES CONSECUTIVELY WITHIN FIXED TIME PERIOD T2 | LIGHT SOURCE | INCREASE LIGHT QUANTITY | ON |
| ID06 | SS_4 | TOUCH SAME PLACE TWO TIMES CONSECUTIVELY WITHIN FIXED TIME PERIOD T2 | LIGHT SOURCE | DECREASE LIGHT QUANTITY | ON |
| ID07 | SS_5 | TOUCH SAME PLACE TWO TIMES CONSECUTIVELY WITHIN FIXED TIME PERIOD T2 | ELECTRIC UNIT FOR SWITCHING MICROSCOPIC EXAMINATION METHOD | SWITCH TO NEXT MICROSCOPIC EXAMINATION METHOD | OFF |
| ID08 | SS_6 | TOUCH SAME PLACE TWO TIMES CONSECUTIVELY WITHIN FIXED TIME PERIOD T2 | ELECTRIC UNIT FOR SWITCHING MICROSCOPIC EXAMINATION METHOD | SWITCH TO PREVIOUS MICROSCOPIC EXAMINATION METHOD | OFF |
| ID09 | SS_7 | UNASSIGNED | UNASSIGNED | UNASSIGNED | OFF |
| ID10 | SS_8 | UNASSIGNED | UNASSIGNED | UNASSIGNED | OFF |
| ID11 | SS_9 | UNASSIGNED | UNASSIGNED | UNASSIGNED | OFF |

FIG. 23

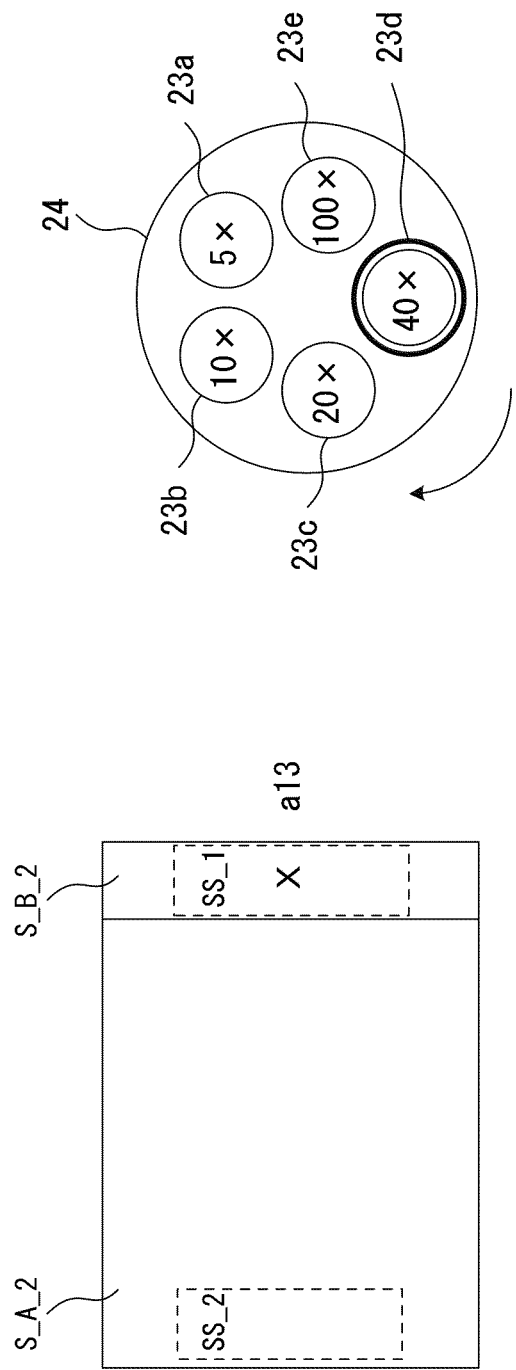

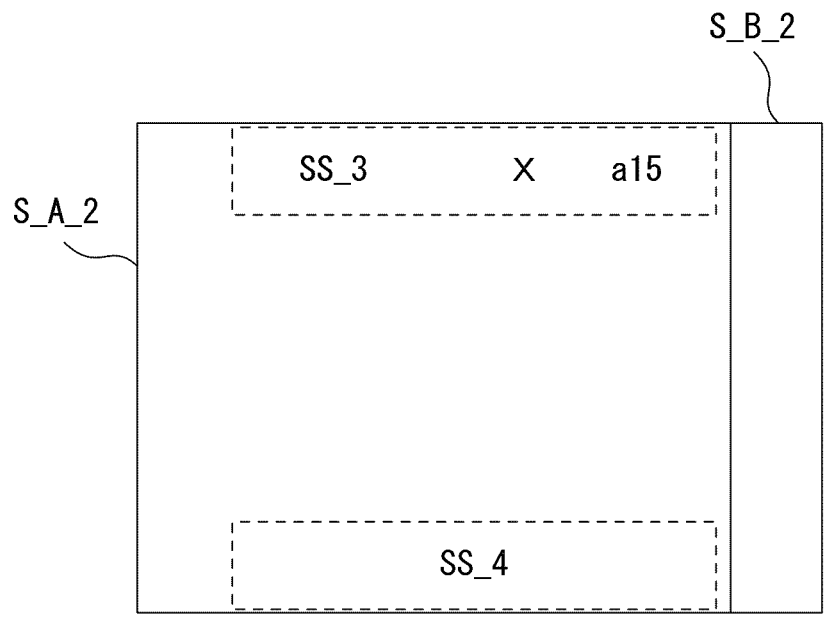
F I G. 3 3

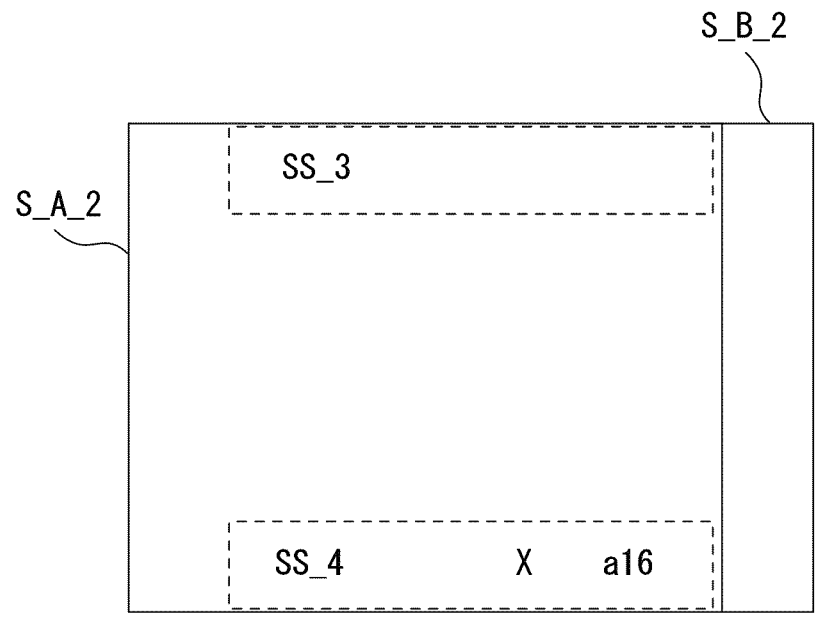
F I G. 3 4

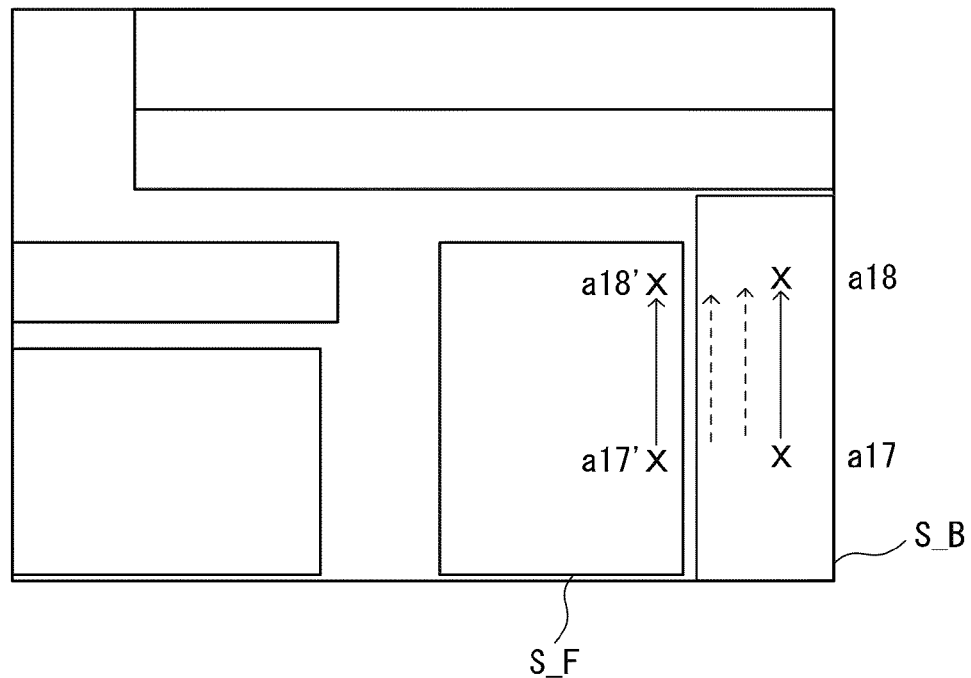
F I G. 36

MICROSCOPE CONTROLLER AND
MICROSCOPE SYSTEM COMPRISING
MICROSCOPE CONTROLLER

CROSS REFERENCE TO RELATED
APPLICATIONS

This application is based upon and claims the benefit of priority from the prior Japanese Patent Application No. 2009-276055, filed Dec. 4, 2009, the entire contents of which are incorporated herein by reference.

BACKGROUND OF THE INVENTION

1. Field of the Invention

The present invention relates to a microscope system that has a plurality of objective lenses, performs an enlargement observation of a minute sample, and has various optical members driven by a motor.

2. Description of the Related Art

Microscope apparatuses are widely used for research, inspections, and the like in the field of biology industry as well as in the industrial field. If an inspection is carried out using such a microscope apparatus, an observation or inspection is performed by a microscope apparatus including a plurality of objective lenses typically with different magnifications by operating an electric stage that can move an observation sample within a plane orthogonal to a light path extending from the objective lenses. When a sample is observed by such a microscope apparatus, it is necessary to operate various component units composing the microscope apparatus (e.g., various illuminators, an aperture stop, a field stop, a revolver, an automatic focusing mechanism, an optical element switching mechanism for a lens, a filter, and the like) in accordance with an observation condition.

As an example, as a technique for operating these component units, the following method is generally known. In this method, an operation apparatus is connected to the microscope body; each component unit is driven in accordance with operations via the operation apparatus; and the drive status of each component unit is grasped via a display provided by the operation apparatus. In other words, a dedicated controller for microscopes or a microscope controller, such as a PC (personal computer), is connected to the microscope body via a communication cable. Then, commands are transmitted to or received from the microscope body in accordance with the operation of the microscope controller, and various settings are established by driving and controlling each component unit.

As an example, in regard to such a technology, the system described in International Publication No. WO96/18924 and the apparatus described in Japanese Laid-open Patent Publication No. 2008-292578 are proposed.

In recent years, microscope controllers having a touch panel function for addressing many operations have started appearing. In other words, an optional button region is provided on the touch panel and the microscope is operated by depressing this region. In order to operate the button region, it is necessary to separate one's eye from the ocular lens and confirm the position of the button region; in microscopy, therefore, superior operability in which an observation can be performed without looking at the button region is also pursued.

SUMMARY OF THE INVENTION

An apparatus according to one aspect of the present invention is a microscope controller by which an operation is performed for controlling the operation of each of a plurality of electric units included in a microscope system, and which comprises a touch panel unit, a control unit, and a communication control unit. The touch panel unit receives inputs provided by a physical contact from outside, and has a display function. The control unit establishes a plurality of functional areas within the display region of the touch panel unit as regions for making operable each of the plurality of electric units. In addition, when an input to any of the plurality of functional areas provided by a physical contact from outside is detected, the control unit generates a control instruction signal for controlling an electric unit corresponding to this functional area. The communication control unit transmits the control instruction signal generated by the control unit to an external device that controls the operation of the corresponding electric unit. Then, when an input provided by a physical contact from outside to a predetermined functional area of the plurality of functional areas is detected, the control unit reestablishes a plurality of functional areas in the display region of the touch panel unit so as to enlarge the functional area or a plurality of specific functional areas including the functional area. In addition, when an input provided by a physical contact from outside to any of the plurality of functional areas after the reestablishment is detected, the control unit generates a control instruction signal for controlling an electric unit corresponding to the functional area.

BRIEF DESCRIPTION OF THE DRAWINGS

FIG. 2 is a diagram illustrating an exemplary configuration of the inside of a microscope controller according to the first embodiment;

FIG. 8A is a diagram 2_1 illustrating a specific example of an operation that is performed when a user performs a drag operation on functional area S_A in the display screen illustrated in FIG. 5;

FIG. 8B is a diagram 2_2 illustrating a specific example of an operation that is performed when a user performs a drag operation on functional area S_A in the display screen illustrated in FIG. 5;

FIG. 11A is a diagram 2_1 illustrating a specific example of an operation that is performed when a user performs a drag operation on functional area S_B in the display screen illustrated in FIG. 5;

FIG. 11B is a diagram 2_2 illustrating a specific example of an operation that is performed when a user performs a drag operation on functional area S_B in the display screen illustrated in FIG. 5;

FIG. 13B is a diagram 1_2 illustrating a specific example of an operation that is performed when a user performs an operation on functional area S_C in the display screen illustrated in FIG. 5;

FIG. 14B is a diagram 2_2 illustrating a specific example of an operation that is performed when a user performs an operation on functional area S_C in the display screen illustrated in FIG. 5;

FIG. 16 is a diagram illustrating an example of a process flow relating to an operation which is performed when an enlarged functional area mode of the microscope controller according to the first embodiment is set;

FIG. 17 is a diagram illustrating an example of the display screen of the touch panel which is indicated when a plurality of functional areas are reestablished in the display region of the touch panel via the process of S312;

FIG. 18A is a diagram 1 illustrating a specific example of an operation that is performed when a user performs a drag operation on functional area S_A_2 in the display screen illustrated in FIG. 17;

FIG. 18B is a diagram 2 illustrating a specific example of an operation that is performed when a user performs a drag operation on functional area S_A_2 in the display screen illustrated in FIG. 17;

FIG. 20A is a diagram 1 illustrating a specific example of an operation that is performed when a user performs a drag operation from functional area S_A_2 to functional area S_B_2 in the display screen illustrated in FIG. 17;

FIG. 20B is a diagram 2 illustrating a specific example of an operation that is performed when a user performs a drag operation from functional area S_A_2 to functional area S_B_2 in the display screen illustrated in FIG. 17;

FIG. 23 is a diagram illustrating an example of specific operation information recorded as a table in nonvolatile memory of a microscope controller according to the second embodiment;

FIG. 31A is a diagram 2_1 illustrating a specific example of an operation which is performed when a user performs an input via two touch operations within the fixed time period T2 at the same position in input area SS_1 or SS_2 in the display screen indicated in FIG. 17 (FIG. 25);

FIG. 31B is a diagram 2_2 illustrating a specific example of an operation which is performed when a user performs an input via two touch operations within the fixed time period T2 at the same position in input area SS_1 or SS_2 in the display screen indicated in FIG. 17 (FIG. 25);

FIG. 33 is a diagram 1 illustrating a specific example of an operation which is performed when a user performs an input via two touch operations within the fixed time period T2 at the same position in input area SS_3 or SS_4 in the display screen indicated in FIG. 17 (FIG. 25);

FIG. 34 is a diagram 2 illustrating a specific example of an operation which is performed when a user performs an input via two touch operations within the fixed time period T2 at the same position in input area SS_3 or SS_4 in the display screen indicated in FIG. 17 (FIG. 25);

FIG. 36 is a diagram 2 illustrating an operation which is performed when drag operations are repeatedly performed on functional area S_B and when some of the drag operations mistakenly deviate to another functional area.

DESCRIPTION OF THE PREFERRED EMBODIMENT

Figure 1:
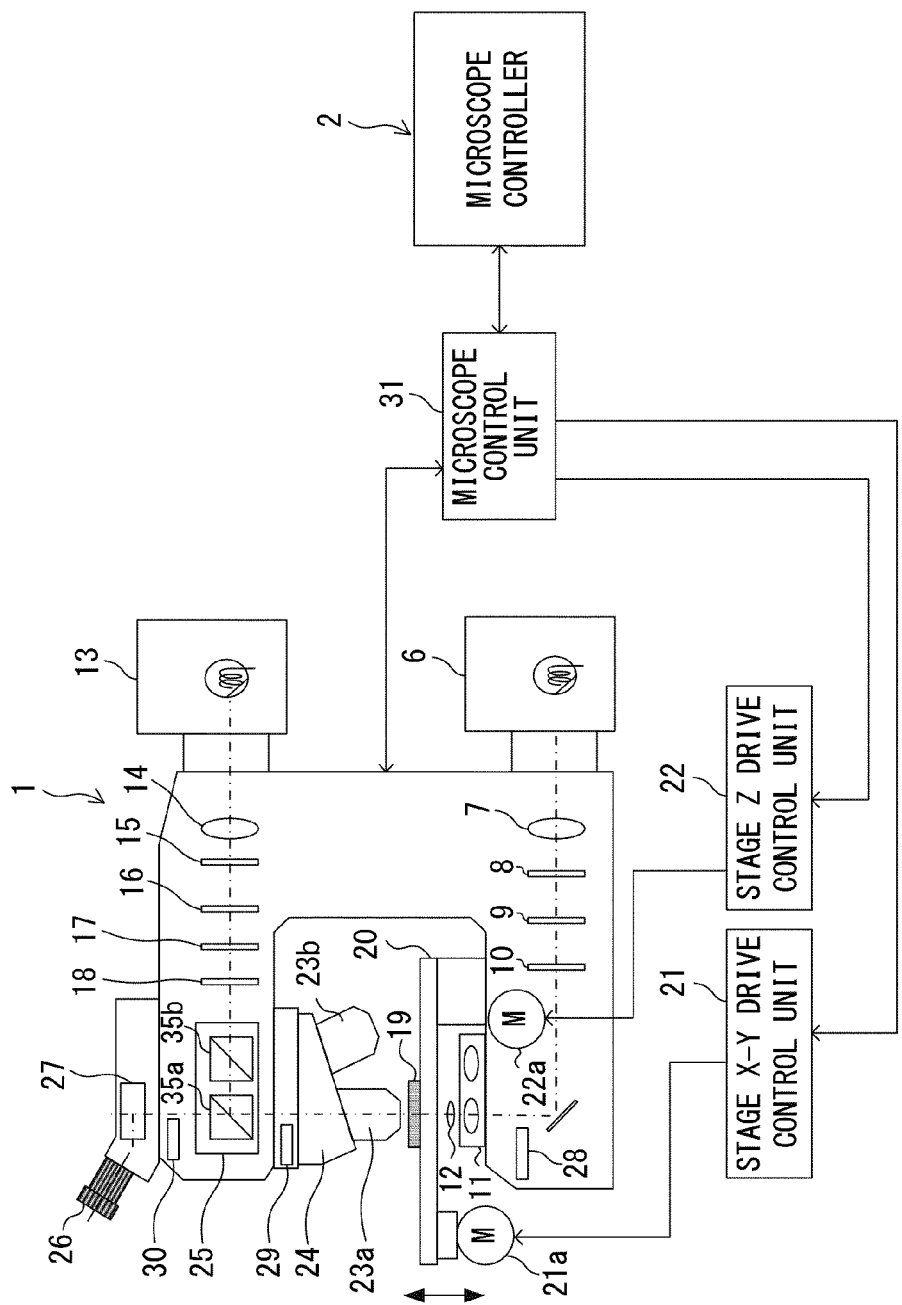
FIG. 1 is a diagram illustrating an exemplary configuration of a microscope system according to the first embodiment.

In the following, embodiments of the present invention will be described with reference to the drawings.

A microscope controller for performing an operation for controlling the operation of each of a plurality of electric units included in a microscope system according to embodiments of the present invention comprises a touch panel unit, a control unit, and a communication control unit.

The touch panel unit receives inputs provided by a physical contact from outside, and has a display function. The touch panel unit corresponds to, for example, a touch panel 207 of the present embodiment.

The control unit establishes a plurality of functional areas within the display region of the touch panel unit as regions for making operable each of the plurality of electric units. In addition, when an input provided by a physical contact from outside to any of the plurality of functional areas is detected, the control unit generates a control instruction signal for controlling an electric unit corresponding to this functional area. Then, when an input provided by a physical contact from outside to a predetermined functional area of the established plurality of functional areas is detected, the control unit reestablishes a plurality of functional areas in the display region of the touch panel unit so as to enlarge this functional area or a plurality of specific functional areas including this functional area. In addition, when an input provided by a physical contact from outside to any of the plurality of functional areas after the reestablishing is detected, the control unit generates a control instruction signal for controlling an electric unit corresponding to this functional area. The control unit corresponds to, for example, a CPU 201 of the present embodiment.

The communication control unit transmits the control instruction signal generated by the control unit to an external device that controls the operation of the corresponding electric unit. The communication control unit corresponds to, for example, a communication control unit 205 of the present embodiment.

Such a configuration can improve the user operability of a microscope.

Here, in regard to the functional area enlarged via the reestablishment, when the physical contact from outside to this functional area is a drag operation, this functional area can enable an operation for causing an electric unit corresponding to this functional area to be continuously operated in conjunction with the drag operation.

Such a configuration enables a user to perform, on an enlarged functional area, a drag operation for causing an electric unit to be continuously operated; therefore, user operability can be improved.

Functional areas enlarged via the reestablishment can be a functional area for making operable an electric unit for moving a sample or an objective lens in the optical axis direction of a stage, and a functional area for making operable an electric unit for moving a sample or objective lens in the direction perpendicular to the optical axis direction of the stage.

Such a configuration enables a user to perform, on an enlarged functional area, drag operations for moving a sample or objective lens in the optical axis direction of the stage and in the direction perpendicular to the optical axis direction of the stage; therefore, user operability can be improved.

A plurality of functional areas established or reestablished in the display region of the touch panel unit can be configured to include one or more of a functional areas for making operable the electric unit for moving a sample or objective lens in the optical axis direction of the stage, a functional area for making operable the electric unit for moving a sample or objective lens in the direction perpendicular to the optical axis direction of the stage, a functional area for making operable an electric unit for switching the lighting control quantity of a light source, a functional area for making operable an electric unit for switching an optical magnification, a functional area for making operable an electric unit for switching the position of an optical element turret, and a functional area for making operable an electric unit for switching a microscopic examination method.

Such a configuration enables a user to operate various electric units.

A plurality of functional areas established or reestablished in the display region of the touch panel unit include a functional area for enabling an operation for causing a corresponding electric unit to be continuously operated in conjunction with a drag operation when a physical contact from outside is a drag operation, and the control unit can also be configured so that when a physical contact from outside started in this functional area is a drag operation and when the physical contact made by this drag operation continues to another functional area, the control unit generates a control instruction signal for controlling only the electric unit corresponding to the functional area in which the physical contact above made by this drag operation is started.

Such a configuration enables only a desired electric unit to be operated even in, for example, a situation in which a user starts a drag operation on a desired functional area and the drag operation is mistakenly brought to another functional area.

Of the plurality of functional areas established or reestablished in the display region of the touch panel unit, when an input provided by a physical contact from outside is detected in a certain functional area, other than a functional area for enabling an operation for causing a corresponding electric unit to be continuously operated in conjunction with a drag operation if a physical contact from outside is provided by the drag operation, the control unit can also generate a control instruction signal for controlling an electric unit corresponding to the functional areas on the basis of a position at which the physical contact stops.

Such a configuration enables an electric unit to be operated in accordance with a position at which a physical contact stops (e.g., the position at which a finger is removed from the touch panel) when the physical contact is performed on a functional area.

The control unit can also be configured so that when an input provided by a physical contact from outside to the display region of the touch panel unit is detected, the control unit determines whether or not the physical contact is provided via a specific operation defined in advance, so that when the determination result is a judgment of true, the control unit generates a control instruction signal for controlling an electric unit corresponding to this specific operation.

Such a configuration also enables a user to operate a desired electric unit by performing a specific operation.

Here, the specific operation can also include an operation in which the same position on a predetermined region established within the display region of the touch panel unit is touched two times consecutively within a fixed time period.

Such a configuration also enables a user to operate a desired electric unit by performing such an operation.

The specific operation can also include an operation in which a physical contact is performed in a circular motion on a predetermined region established in the display region of the touch panel unit within a fixed time period.

Such a configuration also enables a user to operate a desired electric unit by performing such an operation.

The control unit can also be configured so that in accordance with a specific operation, it generates a control instruction signal for controlling any of an electric unit for switching the lighting control quantity of a light source, an electric unit for switching an optical magnification, an electric unit for switching the position of an optical element turret, and an electric unit for switching a microscopic examination method.

Such a configuration also enables a user to operate various electric units by performing the specific operation.

It is also possible for a user to optionally set the combination of the specific operation and the corresponding electric units.

Such a configuration enables a user to freely change an electric unit to operate by performing a specific operation.

The microscope system can also be configured to comprise a microscope controller.

[First Embodiment]

FIG. 1 is a diagram illustrating an exemplary configuration of a microscope system according to the first embodiment of the present invention.

In FIG. 1, an upright microscope apparatus 1 includes, as a transmission observation optical system, a transmitted illumination light source 6, a collector lens 7 for collecting illumination light of the transmitted illumination light source 6, a transmission filter unit 8, a transmission field stop 9, a transmission aperture stop 10, a condenser optical element unit 11, and a top lens unit 12.

The microscope apparatus 1 also includes, as an epi-illumination observation optical system, an epi-illumination light source 13, a collector lens 14, an epi-illumination filter unit 15, an epi-illumination shutter 16, an epi-illumination field stop 17, and an epi-illumination aperture stop 18.

On an observation light path at which the light path of the transmission observation optical system and the light path of the epi-illumination observation optical system overlap with each other, an electric stage 20 is provided on which a sample 19 is placed. The electric stage 20 can be moved in a vertical (Z) direction and can be moved in a horizontal (X, Y) direction. In the present embodiment, the positional relationship between the sample 19 and the objective lens changes via the electric stage 20 being moved; however, it is also possible to make a configuration such that the positional relationship between the sample 19 and the objective lens changes via the objective lens being moved. Alternatively, it is also possible to make a configuration such that the positional relationship between the sample 19 and the objective lens changes via one of the sample 19 and the objective lens being moved in the vertical direction and the other being moved in the horizontal direction.

The movement of the electric stage 20 is controlled by a stage X-Y drive control unit 21 and a stage Z drive control unit 22. The stage X-Y drive control unit 21 moves the electric stage 20 in the X direction and Y direction by controlling the driving of an X-Y motor 21a. The stage Z drive control unit 22 moves the electric stage 20 in the Z direction by controlling the driving of a Z motor 22a.

The electric stage 20 has an origin detection function (not illustrated) provided by an origin sensor. Therefore, the movement control can be performed via the coordinate detection and coordinate designation of the sample 19 placed on the electric stage 20.

A revolver 24, a cube turret 25, and a beam splitter 27 are provided on the light path.

The revolver 24 is mounted with a plurality of objective lenses 23a, 23b, . . . (hereinafter generally referred to as "objective lenses 23" if necessary). An objective lens to be used for the observation can be selected from the plurality of objective lenses 23 by rotating the revolver 24.

A fluorescence cube A (35a), a fluorescence cube B (35b), and a fluorescence cube C (not illustrated) each have an excitation filter, a dichroic mirror, and an adsorbing filter corresponding to various fluorescence observation wavelengths. Using the cube turret 25, any of the fluorescence cube A (35a), the fluorescence cube B (35b), the fluorescence cube C (not illustrated), . . . can be switched to and positioned on the light path.

The beam splitter 27 divides the light path into an ocular lens 26 side light path and a video camera (not illustrated) side light path.

In addition, a polarizer 28, a DIC (Differential Interference Contrast) prism 29, and an analyzer 30 for a differential interference observation can be inserted in the observation light path.

Each of these units is made to be electric, and their operations are controlled by a microscope control unit 31, which will be described later.

The microscope control unit 31 is connected to the microscope controller 2. The microscope control unit 31 has a function for controlling the operations of the entirety of the microscope apparatus 1. In accordance with a control signal or command from the microscope controller 2, the microscope control unit 31 changes a microscopic examination method, performs lighting control of the transmitted illumination light source 6 and epi-illumination light source 3, and the like. In addition, the microscope control unit 31 has a function for sending the current microscopic examination state of the microscope apparatus 1 to the microscope controller 2. The microscope control unit 31 is also connected to the stage X-Y drive control unit 21 and stage Z drive control unit 22. Therefore, the microscope controller 2 can also control the electric stage 20 via the microscope control unit 31.

The microscope controller 2 is a controller having a touch panel with which a user actually performs input operations on the microscope apparatus 1. A predetermined attribute for operating the microscope apparatus 1 is set to a predetermined area established in the display region of the touch panel, and this will be described in detail later. A user can perform various operations of the microscope apparatus 1 by operating a functional area to which the predetermined attribute is set (such as a GUI (Graphical User Interface) button and the like displayed in the touch panel).

Figure 3:
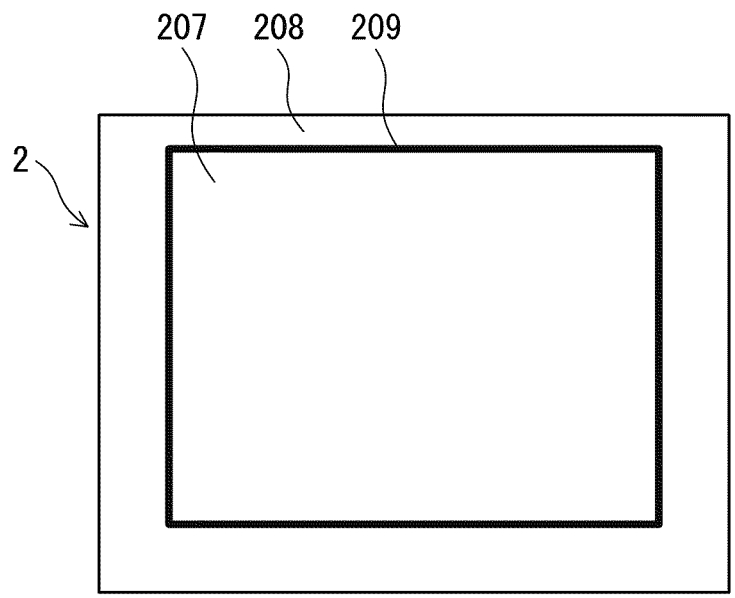
FIG. 3 is a diagram illustrating an example of a portion of the outer package of the microscope controller according to the first embodiment, the portion including a touch panel.

FIG. 2 is a diagram illustrating an exemplary configuration of the inside of the microscope controller 2. FIG. 3 is a diagram illustrating an example of a portion of the outer package of the microscope controller 2, the portion including a touch panel.

As illustrated in FIG. 2, the microscope controller 2 includes a CPU (Central Processing Unit) 201, a ROM (Read Only Memory) 202, a RAM (Random Access Memory) 203, nonvolatile memory 204, a communication control unit 205, a touch panel control unit 206, and a touch panel 207. Under the management of the CPU 201, these components can give various pieces of data to one another and receive various pieces of data from one another via a bus.

The CPU 201 controls the operation of the entirety of the microscope controller 2. A control program used by the CPU 201 to control the operation of the microscope controller 2 is stored in advance in the ROM 202. Application software for controlling the microscope apparatus 1 is also a portion of this control program. The RAM 203 is memory that is used as a work memory area when the CPU 201 executes the control program and that temporarily stores various pieces of data.

Information of a plurality of functional areas to which predetermined attributes including attributes for operation button display (such as icon button display and the like) in the touch panel 207 and used for operating the microscope apparatus 1 are set (hereinafter referred to as "functional area establishment information") is stored in advance in the nonvolatile memory 204. Specifically, the functional area establishment information is information for establishing, in the display region of the touch panel 207, a plurality of functional areas as regions for making operable each of a plurality of electric units included in the microscope system. Establishing a plurality of functional areas within the display region of the touch panel 207 means that a plurality of regions within the display region of the touch panel 207 is provided and a function for making an electric unit operable is assigned to each of the regions. Functions assigned by the functional area establishment information are, for example, a function for making operable an electric unit for moving the electric stage 20 in the XY direction, a function for making operable an electric unit for moving the electric stage 20 in the Z direction, a function for making operable an electric unit for rotating the electric revolver 24 so as to select and insert an optional objective lens into the observation light path, and the like. In the present embodiment, the nonvolatile memory 204 stores at least functional area establishment information for normal functional areas and functional area establishment information for enlarged functional areas.

The communication control unit 205 manages a data communication (e.g., serial communication) with the microscope control unit 31, and transmits to the microscope control unit 31 control information for controlling the operation of each component unit and the like.

The touch panel 207 has both a function as a display apparatus and a function as an operator for input operations. The touch panel 207 can be a touch panel using a membrane resistance system, a capacitive sensing system, an infrared ray system, an ultrasonic system, or the like. The type of the touch panel 207 is not limited. The touch panel control unit 206 detects the X coordinate and Y coordinate of the user's input position on the touch panel 207, and transmits the detected coordinate information to the CPU 201.

As illustrated in FIG. 3, the touch panel 207 is embedded in an outer package 208 of the microscope controller 2. Since the touch panel 207 is embedded in the outer package 208 in such a way that the surface of the touch panel 207 is recessed relative to the surface of the outer package 208, a step 209 serving as a regulation frame is provided between the surface of the touch panel 207 and the surface of the outer package 208. As an example, when a user moves her/his finger on the touch panel 207, the step 209 serving as a regulation frame can prevent the user's finger from accidentally moving outside the touch panel 207. The user can also use the step 209 as a guide by moving her/his finger along the step 209. Therefore, the step 209 is effective when, for example, the user operates the touch panel 207 without looking at it.

Next, the operation of the microscope controller 2 according to the present embodiment will be described.

As operation modes for making operable each of a plurality of electric units included in the microscope system by using the touch panel 207, the microscope controller 2 has two operation modes, a normal functional area mode and an enlarged functional area mode. The normal functional area mode is an operation mode in which, after a plurality of functional areas are established in the display region of the touch panel 207, each of the functional areas remains unchanged (i.e., fixed). Meanwhile, the enlarged functional area mode is an operation mode in which, after a plurality of functional areas are established in the display region of the touch panel 207, a plurality of functional areas can be reestablished in the display region of the touch panel 207 so that some of the functional areas are enlarged. As an example, these two operation modes can be switched via the user operating a switching button (not illustrated). The switching button may be provided virtually in the display region of the touch panel 207 or may be provided physically on the outer package surface of the microscope controller 2.

First, the operation of the microscope controller 2 performed when the operation mode is the normal functional area mode will be described.

Figure 4:
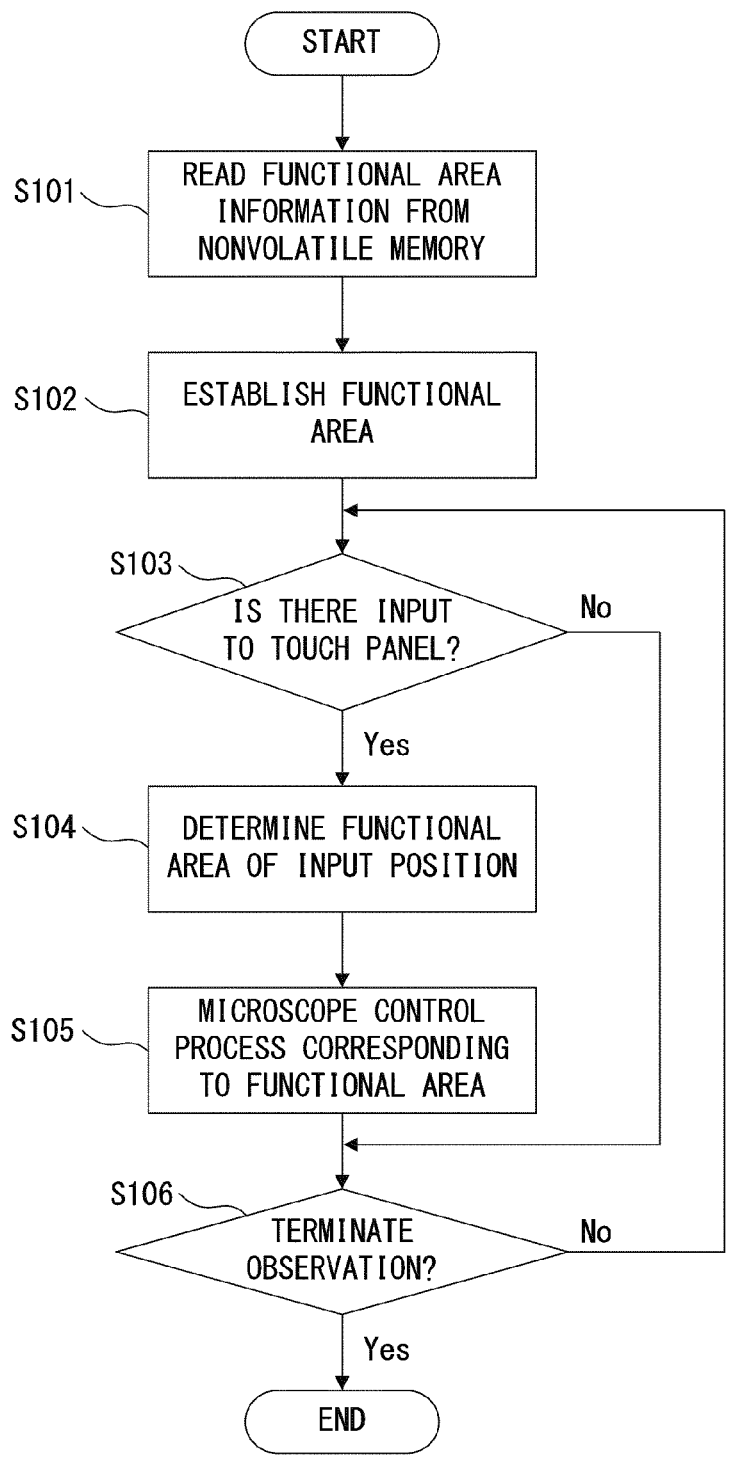
FIG. 4 is a diagram illustrating an example of a process flow relating to an operation that is performed during a normal functional area mode of the microscope controller according to the first embodiment.

FIG. 4 is a diagram illustrating an example of a process flow relating to such an operation above of the microscope controller 2. This process flow is implemented via the CPU 201, which serves as a control unit of the microscope controller 2, reading and executing a control program recorded by the ROM 202.

As illustrated in FIG. 4, first in S101, functional area establishment information for normal functional areas recorded by the nonvolatile memory 204 is read into the RAM 203. In S102, on the basis of the functional area establishment information, functional areas (including a GUI button and the like displayed on the touch panel) are established by assigning to each of the functional areas a predetermined attribute for operating the microscope system 1 on the touch panel 207.

Figure 5:
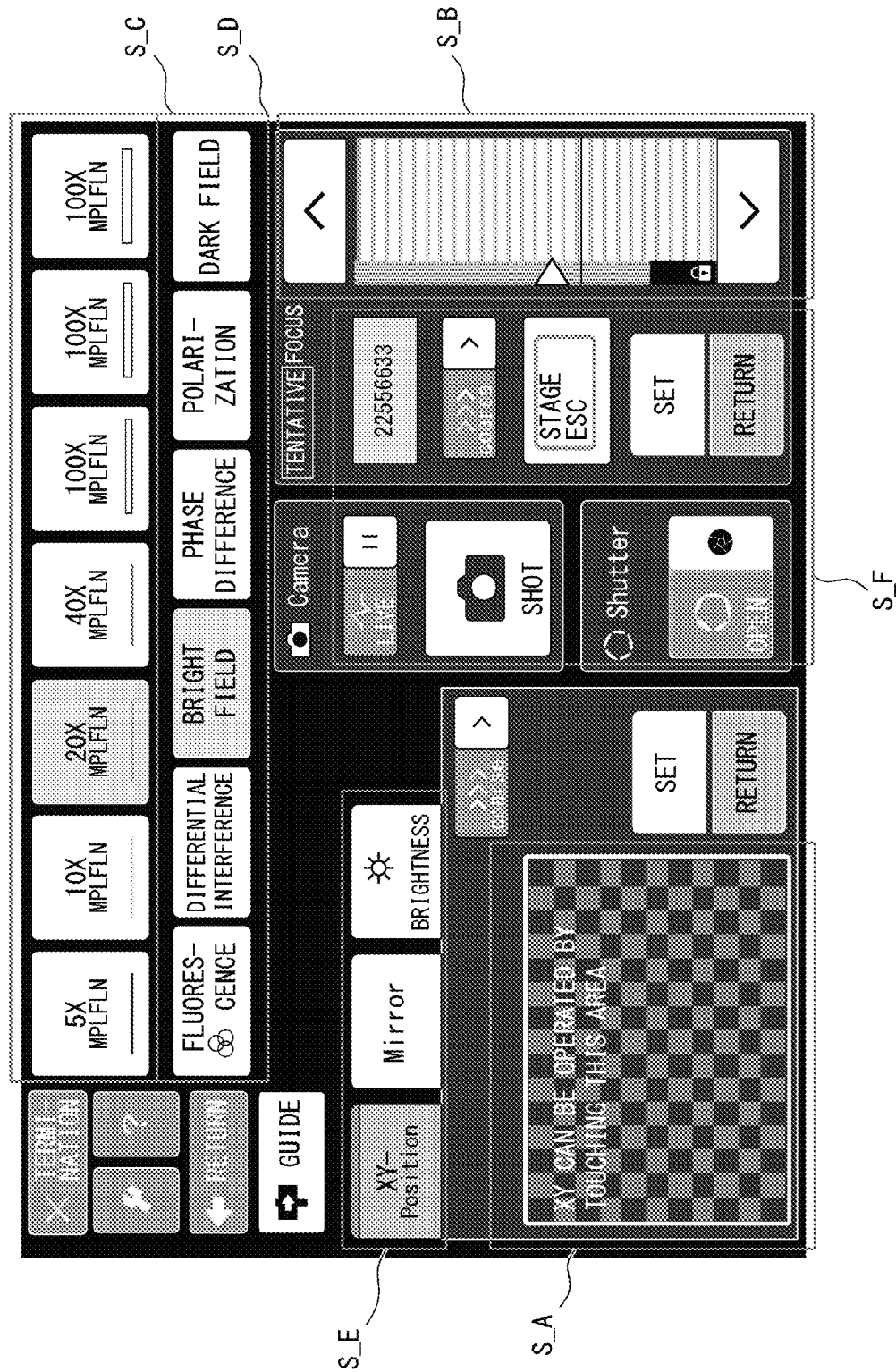
FIG. 5 is a diagram illustrating an example of a display screen of the touch panel which is indicated when a plurality of functional areas are established in the display region of the touch panel via the process of S102.

FIG. 5 is a diagram illustrating an example of the display screen of the touch panel 207 which is indicated when a plurality of functional areas are established in the display region of the touch panel 207 via the process of S102.

In FIG. 5, functional area S_A is a functional area to which a function is assigned for making operable the electric unit for moving the electric stage 20 in the XY direction. Functional area S_B is a functional area to which a function is assigned for making operable the electric unit for moving the electric stage 20 in the Z direction. Functional area S_C is a functional area to which a function is assigned for making operable the electric revolver 24 for switching the objective lenses 23. Functional area S_D is a functional area to which a function is assigned for making operable the electric unit for switching the microscopic examination method. Functional area S_E is a functional area to which a function is assigned for enabling the operation for switching the function assigned to functional area S_A. Functional area S_F is a functional area to which a function is assigned for making operable other electric units.

After the process of S102 is finished, then in the following step, S103, it is determined whether or not there is an input to the touch panel 207, and the process proceeds to S104 if the determination result is Yes (also referred to as "True") and proceeds to S106 if the determination result is No (also referred to as "false"). In S104, the coordinate of the input position within the touch panel 207 (i.e., XY coordinate on the touch panel 207) is obtained, and on the basis of this position and the functional area establishment information read in S101, it is determined which functional area of the touch panel 207 the input corresponds to. In S105, a control process corresponding to the functional area determined in 5104 is performed. In this control process, a control instruction signal corresponding to the operation on the functional area is generated and is transmitted to the microscope control unit 31 by the communication control unit 205, and this will be described later in detail. Then, on the basis of the control instruction signal, the operation of a corresponding electric unit is controlled under the control of the microscope control unit 31. In S106, it is determined whether or not an instruction to terminate the observation has been given, the process flow is terminated if the determination result is Yes, and if the determination result is No, the process returns to S103 and the processes S103-S105 are repeated until Yes is indicated in S106. The instruction to terminate the observation can be given using, for example, a button provided virtually in the display region of the touch panel 207. As an example, in this process flow, when the display screen illustrated in FIG. 5 is indicated and when a user's drag operation (e.g., an operation performed by moving a finger without removing it from the touch panel 207) is performed on functional area S_A or S_B to which a function is assigned for making operable the electric unit for moving the electric stage 20 in the XY direction or Z direction, the operations will be as follows.

Figure 6:
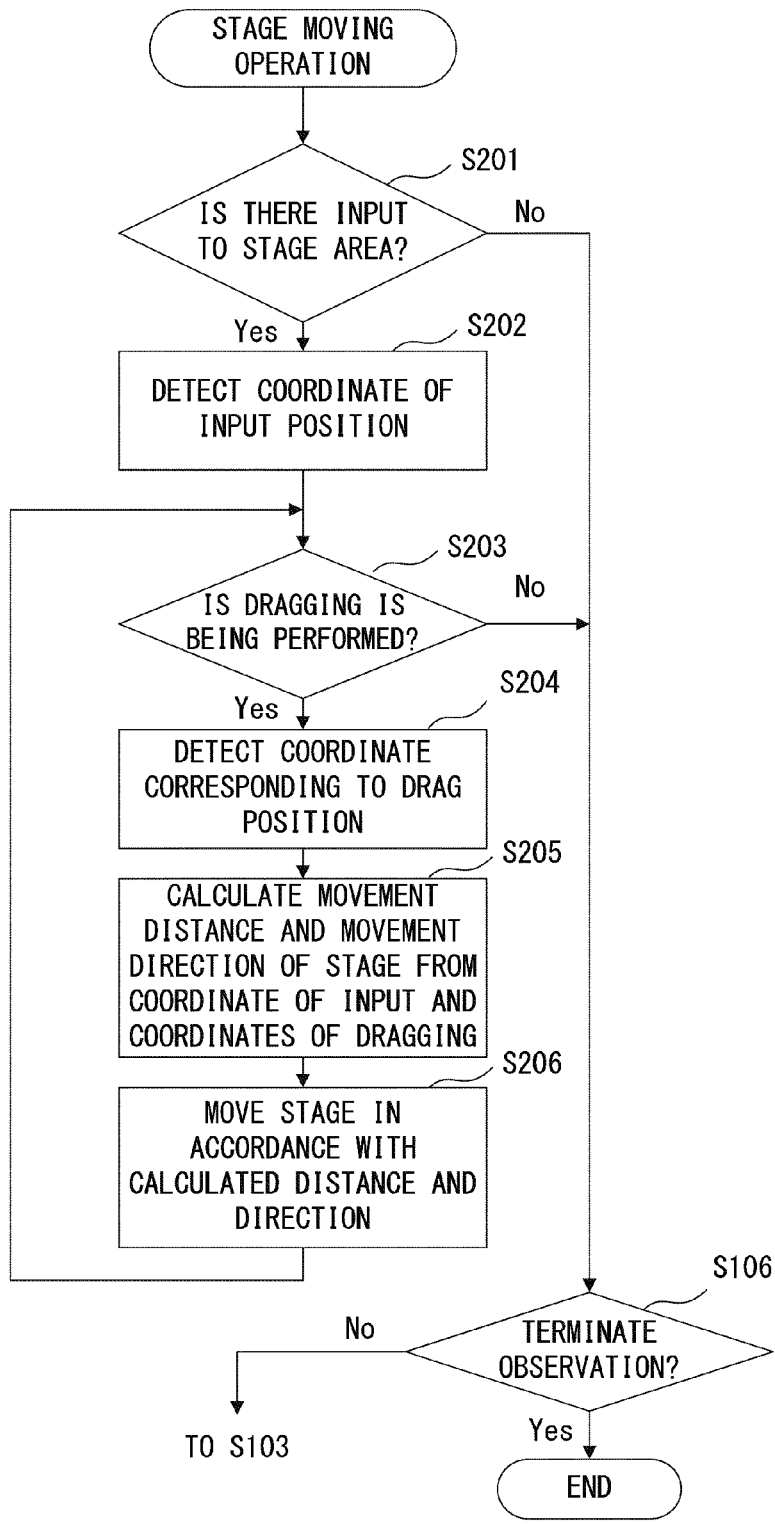
FIG. 6 is a diagram illustrating an example of a process flow relating to an operation that is performed when a user performs a drag operation on functional area S_A or S_B in the display screen illustrated in FIG. 5.

FIG. 6 is a diagram illustrating an example of a process flow relating to such operations and corresponds to the processes of S104-S106 shown in FIG. 4.

In FIG. 6, first in S201, it is determined whether or not there is an input to functional area S_A or S_B (also referred to as a "stage area"), and the process proceeds to S202 if the determination result is Yes and proceeds to S106 if the determination result is No. In S202, the coordinate of the input position within the touch panel 207 (i.e., XY coordinate on the touch panel 207) is detected. In S203, it is determined whether or not the user is currently performing a drag operation, and the process proceeds to S204 if the determination result is Yes and proceeds to S106 if the determination result is No. As an example, it can be determined that a drag operation is currently performed if it can be determined that an input is continuously performed on the touch panel 207, and it can be determined that a drag operation is not currently performed if it cannot be determined that an input is continuously performed on the touch panel 207. In S204, the coordinate of the input position within the touch panel 207 (i.e., coordinate corresponding to the drag position (XY coordinate on the touch panel 207)) is detected. In S205, the movement distance and movement direction of the electric stage 20 are calculated from the coordinate of the input start position detected in S202 and the coordinate of the drag position detected in S204. In S206, a control instruction signal is generated for moving the electric stage 20 in accordance with the calculated movement distance and movement direction, and is transmitted to the microscope control unit 31 via the communication control unit 205. Then, on the basis of the control instruction signal, the microscope control unit 31 controls the stage X-Y drive control unit 21 or stage Z drive control unit 22 so as to drive the X-Y motor 21a or Z motor 22a. In this way, the electric stage 20 is moved in the XY direction or Z direction in accordance with the movement distance and movement direction calculated in S205. After S206, the process returns to S203, and the processes of S203-S206 are repeated until the determination result of S203 is No.

As described above, when a user performs a drag operation on the functional area S_A or S_B, the microscope controller 2 instructs, via the microscope control unit 31, the stage X-Y drive control unit 21 or stage Z drive control unit 22 to control the electric stage 20 in accordance with the distance and direction of the drag operation. The movement distance of the electric stage 20 in the XY direction or Z direction corresponds to the distance of the drag operation on the functional area S_A or S_B. The microscope controller 2 instructs the microscope control unit 31 so that the electric stage 20 moves the distance of the drag operation multiplied by a predetermined coefficient, which will be described later.

Figure 7A:
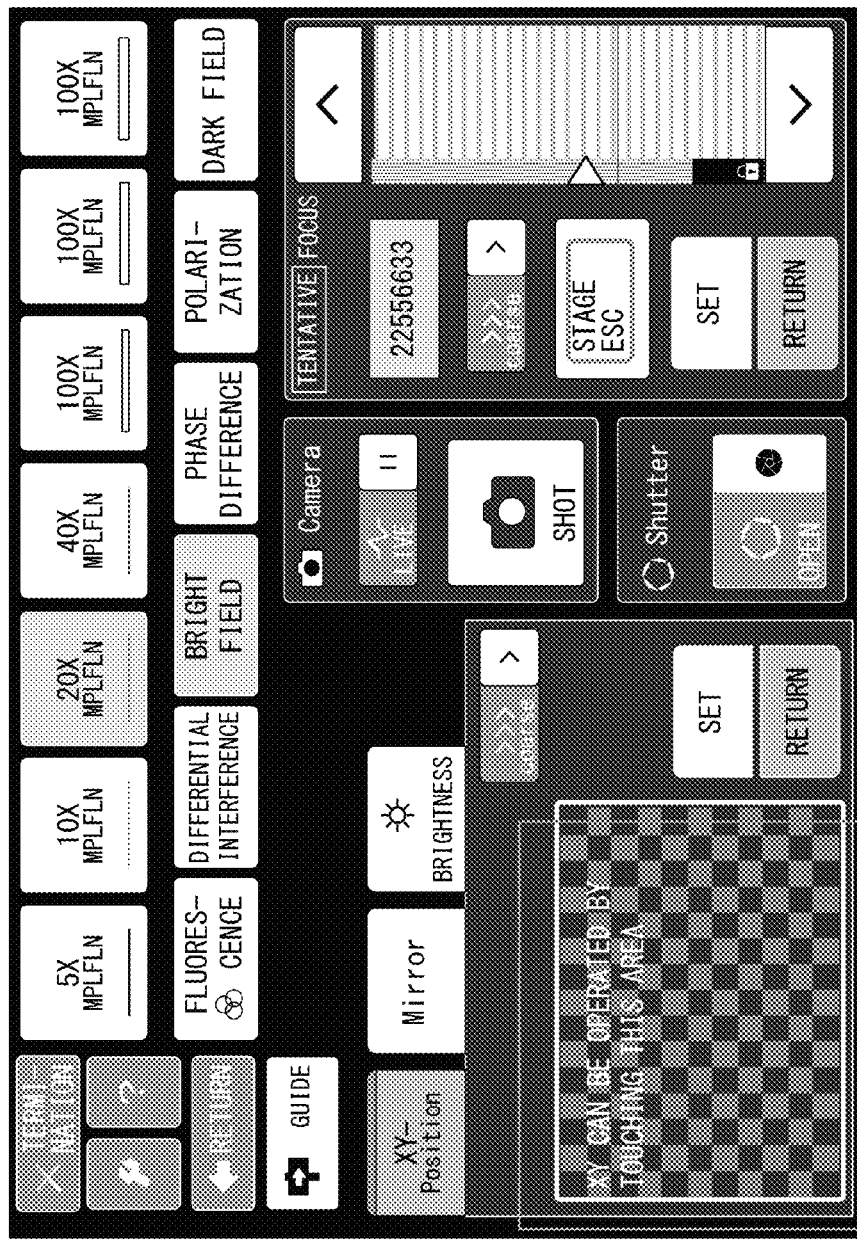
FIG. 7A is a diagram 1_2 illustrating a specific example of an operation that is performed when a user performs a drag operation on functional area S_A in the display screen illustrated in FIG. 5.
Figure 7B:
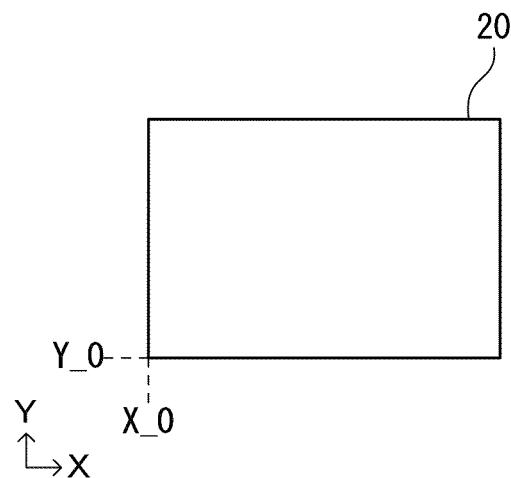
FIG. 7B is a diagram 1_2 illustrating a specific example of an operation that is performed when a user performs a drag operation on functional area S_A in the display screen illustrated in FIG. 5.
Figure 9B:
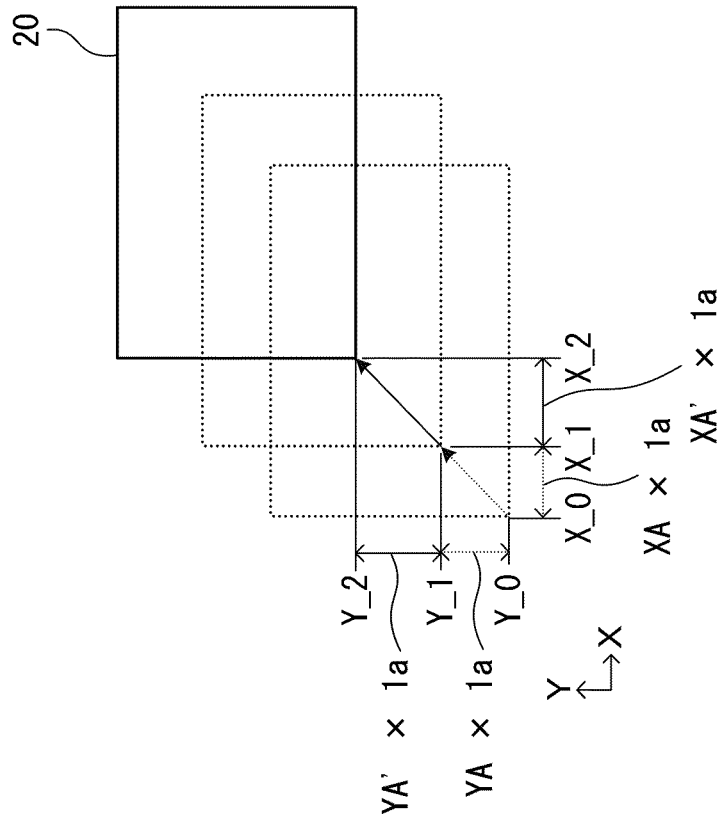
FIG. 9B is a diagram 3_2 illustrating a specific example of an operation that is performed when a user performs a drag operation on functional area S_A in the display screen illustrated in FIG. 5.
Figure 9A:
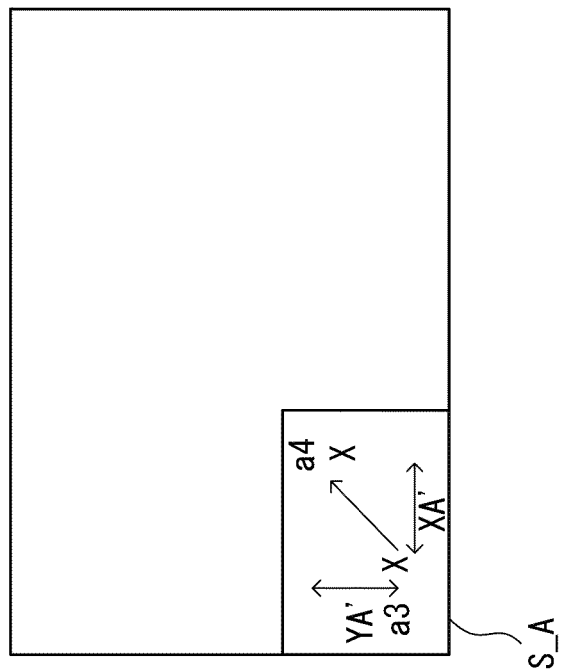
FIG. 9A is a diagram 3_1 illustrating a specific example of an operation that is performed when a user performs a drag operation on functional area S_A in the display screen illustrated in FIG. 5.

FIGS. 7, 8 and 9 are each a diagram illustrating a specific example of an operation that is performed when a user performs a drag operation on functional area S_A in the display screen shown in FIG. 5. FIGS. 7A, 8A and 9A illustrate the display screen of the touch panel 207, and their horizontal direction and vertical direction respectively indicate the X direction and Y direction of the touch panel 207. FIGS. 7B, 8B and 9B schematically illustrate the top surface of the electric stage 20, and their horizontal direction and vertical direction respectively indicate the X direction and Y direction of the electric stage 20.

When, for example, a user's drag operation (e.g., operation performed by moving a finger without removing it from the touch panel 207) is performed on functional area S_A in FIG. 7A, the microscope controller 2 instructs, via the microscope control unit 31, the stage X-Y drive control unit 21 to control the electric stage 20 so that it moves to a position corresponding to the distance and direction of the drag operation. In this case, the movement distance of the electric stage 20 in the XY direction corresponds to the distance of the drag operation on functional area S_A, and the microscope controller 2 instructs the microscope control unit 31 so that the electric stage 20 moves the distance of the drag operation multiplied by coefficient $1a$.

As illustrated in FIGS. 7A and 8A, when, for example, the user performs a drag operation from a spot a1 to a spot a2 on functional area S_A, the X direction distance-component of the drag operation is XA and the Y direction distance-component is YA. The user's drag operation from the spot a1 to the spot a2 is, for example, an operation performed by touching the spot a1 with a finger and moving it to the spot a2 without removing it from the touch panel 207. In this case, as illustrated in FIGS. 7B and 8B, if the XY coordinate of the electric stage 20 before the drag operation is (X_0, Y_0), then the electric stage 20 will be controlled via the drag operation so that it moves to the XY coordinate (X_1, Y_1). Here, the value X_1 is XA multiplied by $1a$ with X_0 added to this product. The value Y_1 is YA multiplied by $1a$ with Y_0 added to this product. In other words, via the drag operation from the spot a1 to the spot a2 on functional area S_A, the electric stage 20 is controlled so that it moves the distance corresponding to XA multiplied by $1a$ in the X direction and so that it moves the distance corresponding to YA multiplied by $1a$ in the Y direction.

After the drag operation above, if the user further performs a drag operation from a spot a3 to a spot a4 on functional area S_A as illustrated in FIG. 9A, the X direction distance-component of this drag operation is XA! and the Y direction distance-component is YA'. In this case, as illustrated in FIG. 9B, the electric stage 20 will be controlled via the drag operation so that it further moves to the XY coordinate (X_2, Y_2). Here, the value X_2 is XA' multiplied by $1a$ with X_1 added to this product. The value Y_2 is YA' multiplied by $1a$ with Y_1 added to this product. In other words, via the drag operation from the spot a3 to the spot a4 on functional area S_A, the electric stage 20 is controlled so that it further moves the distance corresponding to XA' multiplied by $1a$ in the X direction and so that it further moves the distance corresponding to YA' multiplied by $1a$ in the Y direction.

In regard to FIGS. 7-9, for purpose of illustration, examples in which the movement of the electric stage 20 is controlled were described by focusing on the starting spot (e.g., spot al) and finishing spot (e.g., spot a2) of a drag operation. In fact, however, since the processes of S203-S206 in FIG. 6 are repeated during a drag operation, the electric stage 20 is not controlled to move at a one stroke after the drag operation is finished but the movement of the electric stage 20 is controlled so that it continuously follows the drag operation.

Coefficient $1a$ used for the movement control of the electric stage 20 via such a drag operation does not need to be fixed but can be variable. In this case, for example, coefficient $1a$ can be made variable in accordance with the objective lens 23 to be used.

Figure 10A:
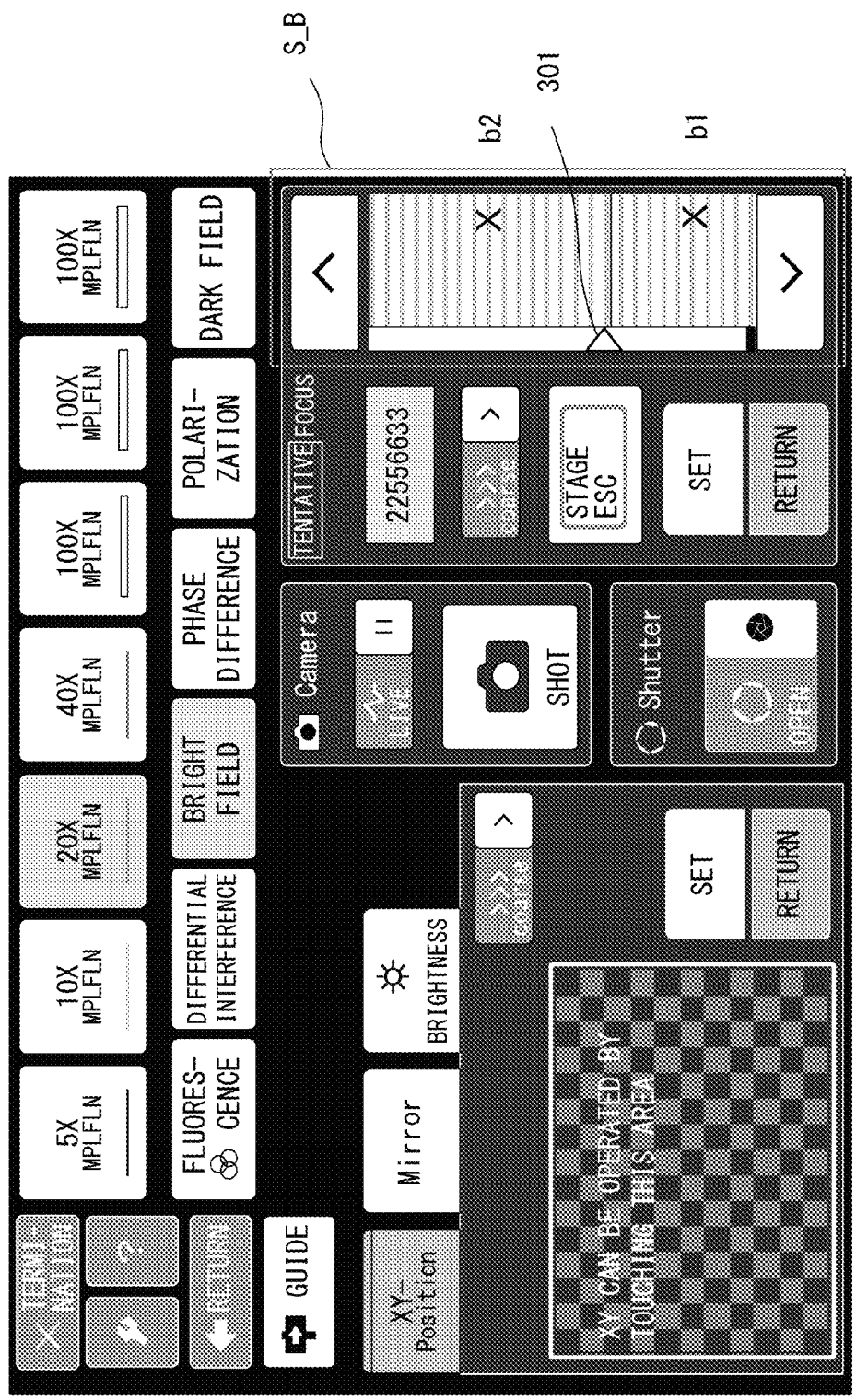
FIG. 10A is a diagram 1_1 illustrating a specific example of an operation that is performed when a user performs a drag operation on functional area S_B in the display screen illustrated in FIG. 5.
Figure 10B:
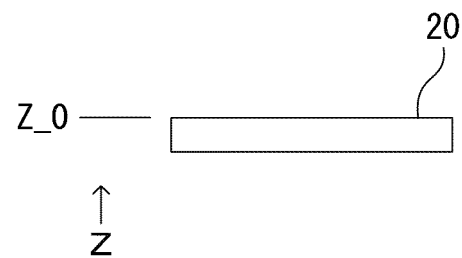
FIG. 10B is a diagram 1_2 illustrating a specific example of an operation that is performed when a user performs a drag operation on functional area S_B in the display screen illustrated in FIG. 5.
Figure 12B:
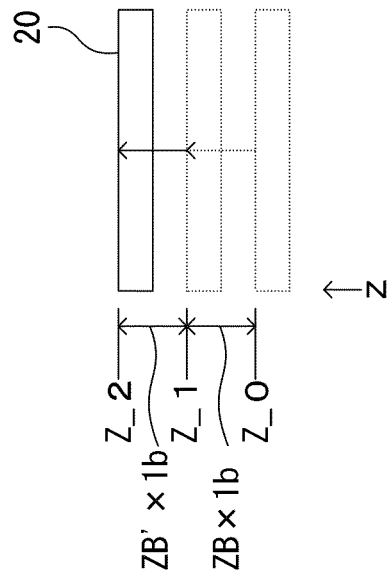
FIG. 12B is a diagram 3_2 illustrating a specific example of an operation that is performed when a user performs a drag operation on functional area S_B in the display screen illustrated in FIG. 5.
Figure 12A:
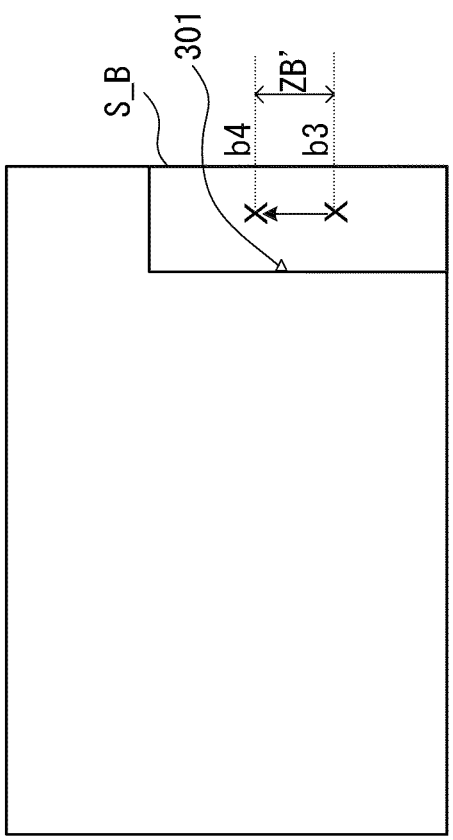
FIG. 12A is a diagram 3_1 illustrating a specific example of an operation that is performed when a user performs a drag operation on functional area S_B in the display screen illustrated in FIG. 5.

FIGS. 10, 11 and 12 are each a diagram illustrating a specific example of an operation that is performed when a user performs a drag operation on functional area S_B in the display screen illustrated in FIG. 5. FIGS. 10A, 11A and 12A illustrate the display screen of the touch panel 207, and their horizontal direction and vertical direction respectively indicate the X direction and Y direction of the touch panel 207. FIGS. 10B, 11B and 12B schematically illustrate the side surface of the electric stage 20, and their vertical direction indicates the Z direction of the electric stage 20.

In FIGS. 10A, 11A and 12A, a bar 301 in functional area S_B indicates the position of the Z direction coordinate of the electric stage 20. It is indicated that as the bar 301 goes further in the upward direction within functional area S_B, the objective lens 23 and electric stage 20 become closer to each other, and as it goes further in the downward direction, the objective lens 23 and electric stage 20 are further separated from each other.

As an example, when a user performs a drag operation from the spot b1 to the spot b2 within functional area S_B in FIG. 10A, the microscope controller 2 gives an instruction to the stage Z drive control unit 22 via the microscope control unit 31 so that the electric stage 20 is controlled to move in a direction in which the objective lens 23 and the electric stage 20 become closer to each other. The user's drag operation from the spot b1 to the spot b2 is, for example, an operation performed by touching the spot b1 with a finger and moving it to the spot b2 without removing it from the touch panel 207. Alternatively, as another example, when the user performs a drag operation from the spot b2 to the spot b1 within functional area S_B, the microscope controller 2 gives an instruction to the stage Z drive control unit 22 via the microscope control unit 31 so that the electric stage 20 is controlled to move in a direction in which the objective lens 23 and the electric stage 20 are away from each other. The user's drag operation from the spot b2 to the spot b1 is, for example, an operation performed by touching the spot b2 with a finger and moving it to the spot b1 without removing it from the touch panel 207. In this case, the movement distance of the electric stage 20 in the Z direction corresponds to the Y direction distance-component of the drag operation on functional area S_B, and the microscope controller 2 gives an instruction to the microscope control unit 31 so that the electric stage 20 moves in the Z direction the distance corresponding to the distance-component multiplied by coefficient $1b$.

As another example, as indicated in FIGS. 10A and 11A, when the user performs a drag operation from the spot b1 to the spot b2 on functional area S_B, the Y direction distance-component of the drag operation is ZB. In this case, if the Z coordinate of the electric stage 20 before the drag operation is Z_0 as illustrated in FIGS. 10B and 11B, the electric stage 20 is controlled via the drag operation so that it moves to the Z coordinate Z_1. Here, the value Z_1 is ZB multiplied by $1b$ with Z_0 added to this product. In other words, via the drag operation from the spot b1 to the spot b2 on functional area S_B, the electric stage 20 is controlled so that it moves the distance corresponding to ZB multiplied by $1b$ in a direction in which the objective lens 23 and the electric stage 20 become closer to each other. In addition, in accordance with this drag operation, the bar 301 in functional area S_B moves to the position corresponding to the Z coordinate Z_1, which is upward from the position it was at before the drag operation as illustrated in FIG. 11A.

After the drag operation above, if the user further performs a drag operation from the spot b3 to the spot b4 on functional area S_B as illustrated in FIG. 12A, the Y direction distance-component of this drag operation is ZB'. In this case, as illustrated in FIG. 12B, the electric stage 20 is controlled via the drag operation so that it further moves to the Z coordinate Z_2. Here, the value Z_2 is ZB' multiplied by 1b with Z_1 added to this product. In other words, via the drag operation from the spot b3 to the spot b4 on functional area S_B, the electric stage 20 is controlled so that it further moves the distance corresponding to ZB' multiplied by 1b in a direction in which the objective lens 23 and the electric stage 20 become closer to each other. In addition, in accordance with this drag operation, the bar 301 in functional area S_B moves to the position corresponding to the Z coordinate Z_2 which is upward from the position it was at before the drag operation, as illustrated in FIG. 12A.

In regard to FIGS. 10-12, for purpose of illustration, examples in which the movement of the electric stage 20 is controlled were described by focusing on the starting spot (e.g., spot b1) and finishing spot (e.g., spot b2) of a drag operation. In fact, however, since the processes of S203-S206 in FIG. 6 are repeated during a drag operation, the electric stage 20 is not controlled to move at one stroke after the drag operation is finished but the movement of the electric stage 20 is controlled so that it continuously follows the drag operation.

Coefficient 1b used for the movement control of the electric stage 20 via such a drag operation does not need to be fixed but can be variable. In this case, for example, coefficient 1b can be made variable in accordance with the objective lens 23 to be used.

As an example, according to the process flow illustrated in FIG. 4, when the display screen illustrated in FIG. 5 is indicated and when a user's operation (e.g., operation performed by touching the touch panel 207 with a finger) is performed on functional areas other than functional area S_A and S_B, the operations will be as follows.

Figure 13A:
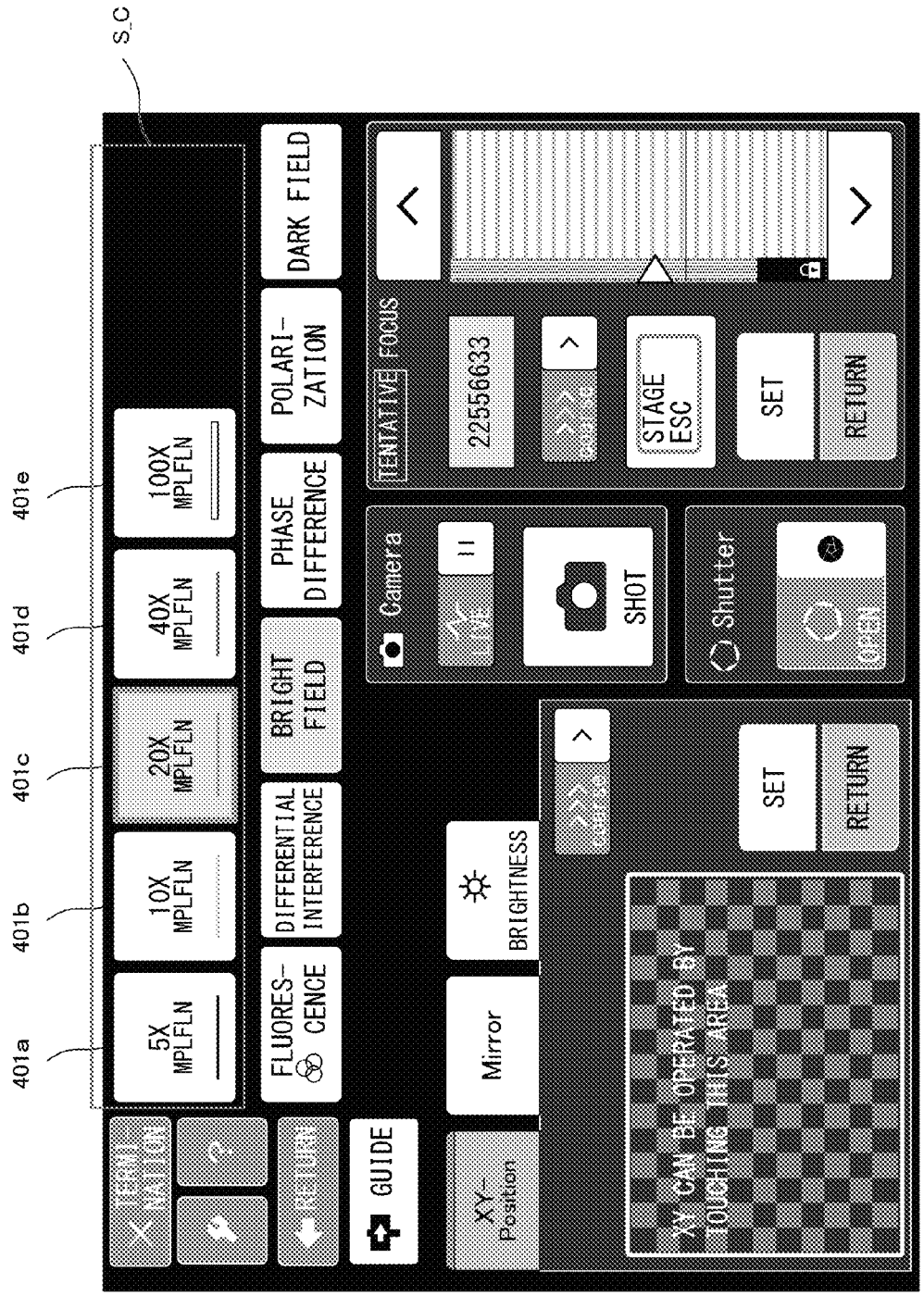
FIG. 13A sis a diagram 1_1 illustrating a specific example of an operation that is performed when a user performs an operation on functional area S_C in the display screen illustrated in FIG. 5.
Figure 14A:
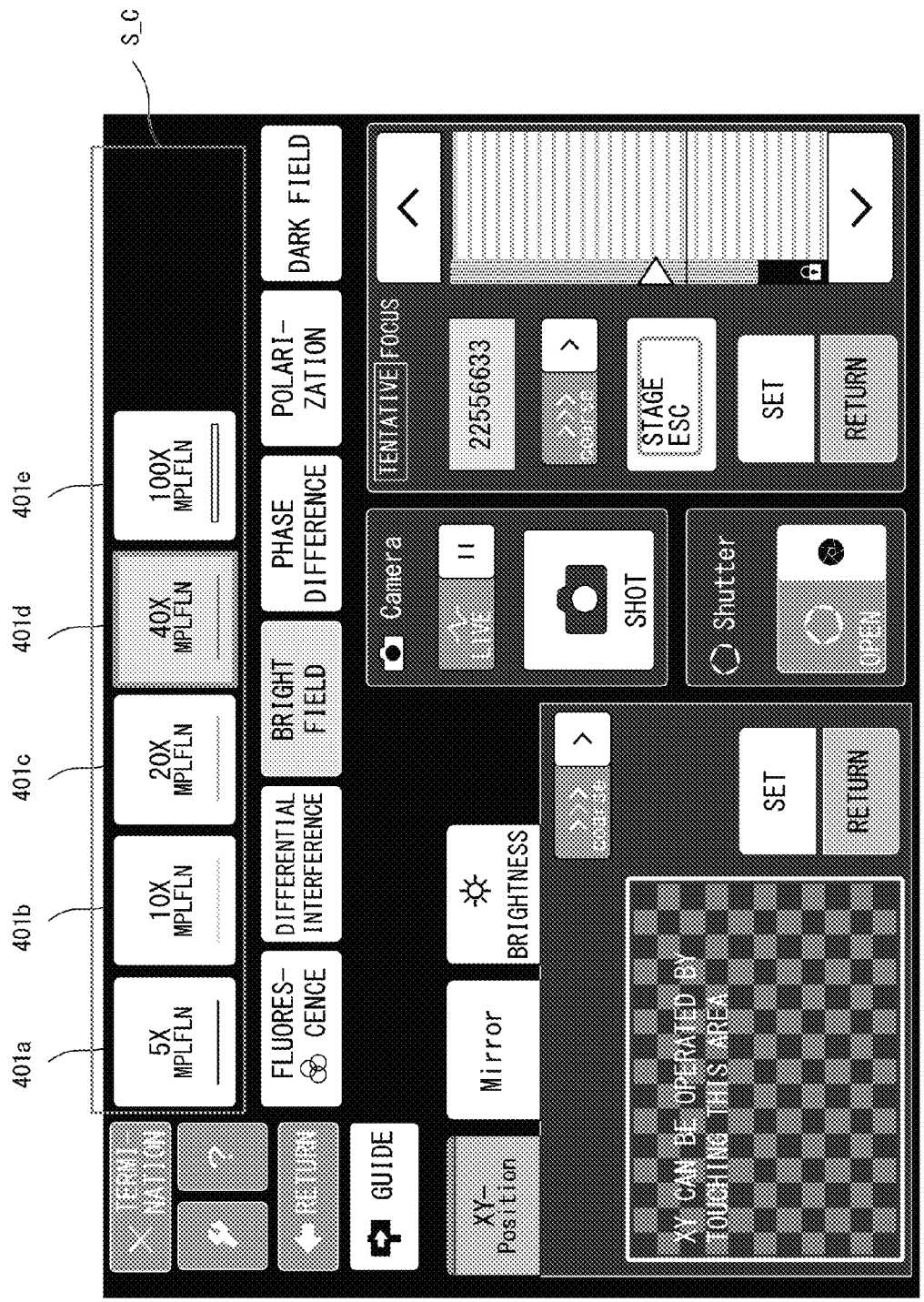
FIG. 14A is a diagram 2_1 illustrating a specific example of an operation that is performed when a user performs an operation on functional area S_C in the display screen illustrated in FIG. 5.

FIGS. 13 and 14 are each a diagram illustrating a specific example of an operation that is performed when a user performs an operation on functional area S_C in the display screen illustrated in FIG. 5. FIGS. 13A and 14A each illustrate the display screen of the touch panel 207. FIGS. 13B and 14B each schematically illustrate the switching position of the electric revolver 24 mounted with a plurality of objective lenses 23, and the objective lens indicated using a thick line is an objective lens inserted in the observation light path. Assume that in the present embodiment, the electric revolver 24 is mounted with an objective lens 23a with a 5-fold magnification (5×), an objective lens 23b with a 10-fold magnification (10×), an objective lens 23c with a 20-fold magnification (20×), an objective lens 23d with a 40-fold magnification (40×), and an objective lens 23e with a 100-fold magnification (100×) as a plurality of objective lenses 23. Also assume that the objective lens 23c with a 20-fold magnification is inserted in the observation light path as illustrated in FIG. 13B.

As illustrated in FIG. 13A, as information of the plurality of objective lenses 23a-23e mounted on the electric revolver 24, corresponding icons 401a-401e are displayed in functional area S_C. One of the icons 401a-401e which is displayed to look different from the others indicates the information of an objective lens inserted in the observation light path. Here, since the objective lens 23c with a 20-fold magnification is inserted in the observation light path (see FIG. 13B), the icon 401c corresponding to the information of the objective lens 23c is displayed to look different from the others.

In this case, when the user touches functional area S_C and when the touch is released (e.g., when the finger in contact with the screen is removed) at the position of the icon 401d, the microscope controller 2 detects the position on the touch panel 207 at which the touch was released (to be exact, the position of the touch just before the release of the touch). Then, the microscope controller 2 gives an instruction to the microscope control unit 31 so that the rotation of the electric revolver 24 is controlled so as to insert, into the observation light path, the objective lens 23d with a 40-fold magnification corresponding to the icon 401d at the detected position. As a result of this, the electric revolver 24 is rotated as illustrated in FIG. 14B, thereby switching the objective lens inserted in the observation light path from the objective lens 23c with a 20-fold magnification to the objective lens 23d with a 40-fold magnification. Also in accordance with this switching, as illustrated in FIG. 14A, the icon 401d (instead of the icon 401c) corresponding to the objective lens 23d with a 40-fold magnification inserted in the observation light path is displayed to look different from the others.

By performing, on functional areas S_D and S_F, operations similar to those performed on functional area S_C described above, desired electric units can be operated on the display screen illustrated in FIG. 5: therefore, the operations performed on functional areas S_D and S_F are not described herein.

As information of a function assigned to functional area S_A, three corresponding icons (i.e., "XY-Position", "Mirror", and "Brightness") are displayed in functional area S_E. One of these three icons, which is displayed to look different from the others, indicates the information of the function assigned to functional area S_A. In the display screen illustrated in FIG. 5, functional area S_A is assigned a function for making operable the electric unit for moving the electric stage 20 in the XY direction; therefore, the icon "XY-Position" corresponding to the information of this function is displayed to look different from the other icons. Note that in the initial setting, functional area S_A is assigned a function for making operable the electric unit for moving the electric stage 20 in the XY direction.

Figure 15:
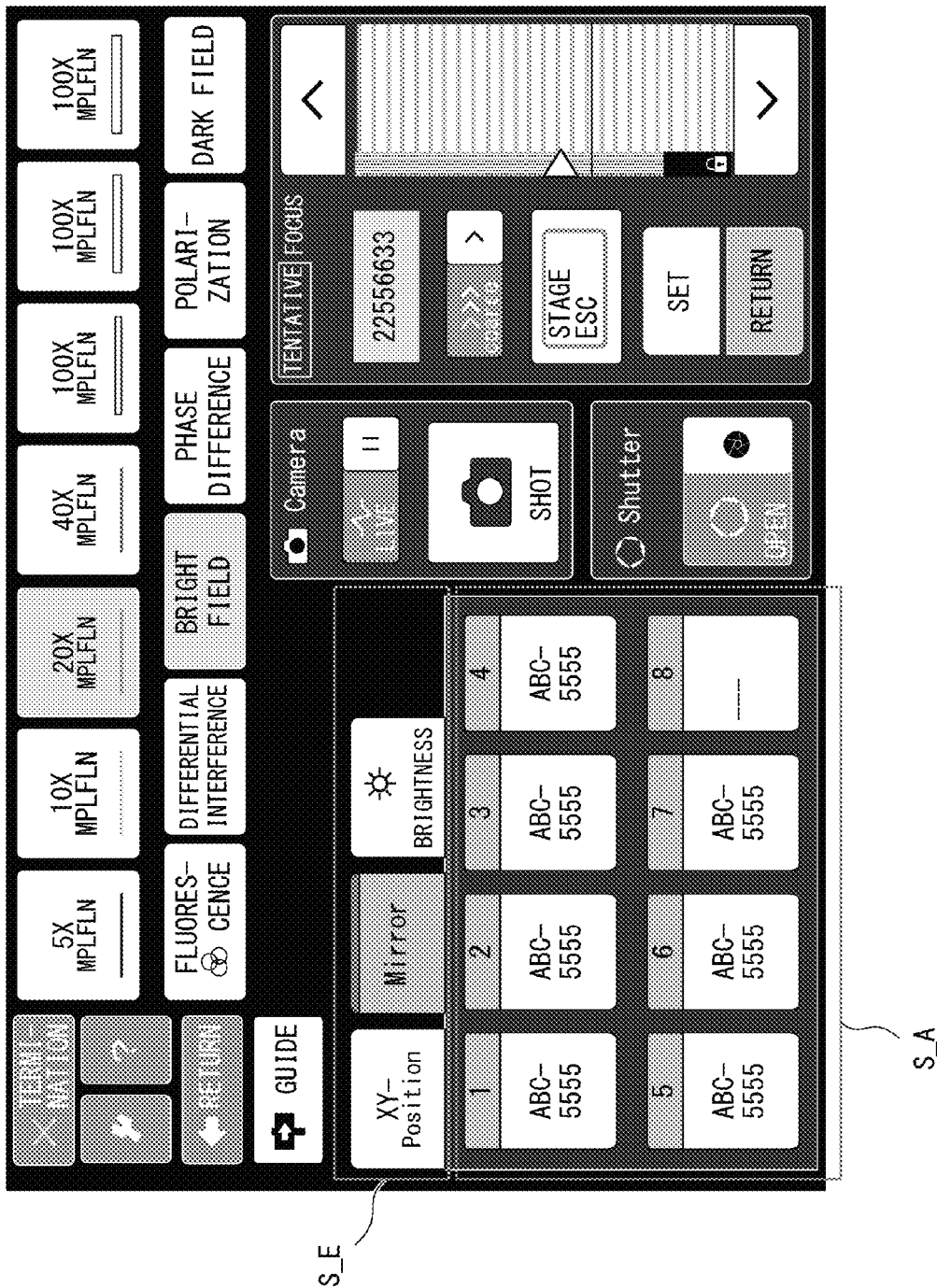
FIG. 15 is a diagram illustrating an example of the display screen of the touch panel which is indicated when a function assigned to functional area S_A is switched to a function for making operable an electric unit for switching the position of a cube turret.

In this case, when the user touches functional area S_E and when the touch is released (e.g., when the finger in contact with the screen is removed) at the position of the icon "Mirror" or "Brightness", the microscope controller 2 detects the position on the touch panel 207 at which the touch was released (to be exact, the position of the touch just before the release of the touch). Then, in accordance with the icon "Mirror" or "Brightness" at the detected position, the microscope controller 2 switches the function assigned to functional area S_A to the function for making operable the electric unit for switching the position of the cube turret 25 or to the function for making operable the electric unit for switching the lighting control quantity of the transmitted illumination light source 6 or the epi-illumination light source 13. As an example, when the function assigned to functional area S_A is switched to the function for making operable the electric unit for switching the position of the cube turret 25, the icon "Mirror" in functional area S_E is displayed to look different from the other icons as illustrated in FIG. 15. In this case, in addition, an icon corresponding to the function switched to is displayed in functional area S_A.

In the present embodiment, of a plurality of functional areas established in the display region of the touch panel 207, in regard to functional areas (e.g., functional area S_C and the like described above) other than functional areas S_A and S_B on which drag operations are performed, on the basis of the position on the touch panel 207 at which the user's touch was released (to be exact, the position of the touch just before the release of the touch), corresponding control is performed. Alternatively, in regard to the functional areas other than functional areas S_A and S_B, it is also possible to make a configuration such that on the basis of the position on the touch panel 207 at which the user began the touch, corresponding control is performed. In addition, in regard to the functional areas other than functional areas S_A and S_B, it is also possible to make a configuration such that users can optionally determine whether to perform corresponding control on the basis of the position on the touch panel 207 at which user's touch is released or to perform corresponding control on the basis of the position on the touch panel 207 at which user's touch is begun. It is also possible to make a configuration such that whether the control is performed on the basis of the starting position or releasing position can be determined depending on a functional area.

Next, an operation of the microscope controller 2 performed when the operation mode is an enlarged functional area mode will be described. Here, as an example, a situation will be described in which functional area S_A to which a function is assigned for making operable the electric unit for moving the electric stage 20 in the XY direction and functional area S_B to which a function is assigned for making operable the electric unit for moving the electric stage 20 in the Z direction are enlarged.

FIG. 16 is a diagram illustrating an example of a process flow relating to the operation above. This process flow is also performed via the CPU 201, which serves as a control unit for the microscope controller 2, recording and executing a control program recorded by the ROM 202.

As illustrated in FIG. 16, first in S301 and S302, processes are performed which are similar to those of S101 and 102 (see FIG. 4) in the process flow performed when the normal functional area mode is selected. Thus, as with the case in the display screen illustrated in FIG. 5, a plurality of functional areas are established in the display region of the touch panel 207. In other words, as illustrated in FIG. 5, functional area S_A is assigned a function for making operable the electric unit for moving the electric stage 20 in the XY direction. Functional area S_B is assigned a function for making operable the electric unit for moving the electric stage 20 in the Z direction. Functional area S_C is assigned a function for making operable the electric revolver 24 for switching the objective lenses 23. Functional area S_D is assigned a function for making operable the electric unit for switching a microscopic examination method. Functional area S_E is assigned a function for enabling the operation for switching the function assigned to functional area S_A. Functional area S_F is assigned a function for making other electric units operable.

Subsequently, in S303, it is determined whether there is an input to the touch panel 207 or not, and the process proceeds to S304 when the determination result is Yes and it proceeds to S307 when the determination result is No. In S304, the coordinate of the position of the input within the touch panel 207 (i.e., the XY coordinate on the touch panel 207) is obtained, and on the basis of this position and the functional area establishment information that was read in S301, it is determined which functional area the input to the touch panel 207 corresponds to. In S305, it is determined whether or not the functional area determined in S304 is a functional area to be enlarged (i.e., functional area S_A or S_B).

When the determination result of S305 is No, the process proceeds to S306. In S306, as with the case of S105 in the process flow under the normal functional area mode (see FIG. 4), a control process is performed in accordance with the functional area determined in S304 (i.e., functional area S_C, S_D, S_E or S_F). In S307, it is determined whether or not an instruction to terminate the observation has been given, and the process flow is terminated when the determination result is Yes and it returns to S303 when the determination result is No.

Meanwhile, when the determination result is Yes in S305, the process proceeds to S311. In S311, functional area establishment information for enlarged functional areas recorded by the nonvolatile memory 204 is read into the RAM 203. In S312, on the basis of the functional area establishment information, a plurality of functional areas are reestablished in the display region of the touch panel 207 so that functional areas S_A and S_B are enlarged.

FIG. 17 is a diagram illustrating an example of the display screen of the touch panel 207 which is indicated when a plurality of functional areas are reestablished in the display region of the touch panel 207 via the process of S312.

In FIG. 17, functional area S_A_2 is a functional area to which a function is assigned for making operable the electric unit for moving the electric stage 20 in the XY direction, and is a functional area that is an enlargement of functional area S_A illustrated in FIG. 5. Functional area S_B_2 is a functional area to which a function is assigned for making operable the electric unit for moving the electric stage 20 in the Z direction, and is a functional area that is an enlargement of functional area S_B illustrated in FIG. 5. A bar 501 in functional area S_B_2 corresponds to the bar 301 in functional area S_B in the display screen illustrated in FIG. 5.

After the process of S312 is finished, in the following step, S313, it is determined whether or not there is an input to the touch panel 207, and the process proceeds to S314 when the determination result is Yes. In S314, the coordinate of the position of the input within the touch panel 207 (i.e., the XY coordinate on the touch panel 207) is detected, and on the basis of this position and the functional area establishment information that was read in S311, it is determined which functional area the input to the touch panel 207 corresponds to. In S316, a control process is performed in accordance with the functional area determined in S314. As an example, control is performed to move the electric stage 20 in the XY direction when the input to the display screen illustrated in FIG. 17 corresponds to functional area S_A_2, and control is performed to move the electric stage 20 in the Z direction when the input to the display screen illustrated in FIG. 17 corresponds to functional area S_B_2.

Meanwhile, the process proceeds to S315 when the determination result of S313 is No. In S315, it is determined whether or not no inputs have been performed on the touch panel 207 for a predetermined time period or longer since a plurality of functional areas were reestablished in S312. The process returns to S301 when the determination result of S315 is Yes, and the process flow is restarted from the beginning.

After S316, or when the determination result of S315 is No, it is determined in the following step, S317, whether or not an instruction to terminate the observation has been given. When the determination result is Yes, the process flow is terminated, and when the determination result is No, the process returns to S313 and the processes of S313-S316 are repeated until Yes is indicated in S315 or S317.

In this process flow, when the determination result of S315 is Yes, the display screen illustrated in, for example, FIG. 17 is switched to the one illustrated in FIG. 5. However, this display screen switching operation can also be performed via, for example, button operations instead of being performed via the determination process of S315. In this case, the switching button may be provided virtually on the touch panel 207 or may be provided physically on the outer package of the microscope controller 2.

In this process flow, when, for example, the user performs a drag operation on functional area S_A_2 or S_B_2 in the display screen illustrated in FIG. 17, the operations performed are essentially similar to the operations which are performed when the user performs a drag operation on functional area S_A or S_B during the normal functional area mode (i.e., the operations which were described using FIGS. 6-12). Specifically, the following operations are performed.

FIGS. 18 are each a diagram illustrating a specific example of an operation that is performed when a user performs a drag operation on functional area S_A_2 in the display screen illustrated in FIG. 17. FIG. 18A illustrates the display screen of the touch panel 207, and the horizontal direction and vertical direction indicate the X direction and Y direction on the touch panel 207. FIG. 18B schematically illustrates the top surface of the electric stage 20, and the horizontal direction and vertical direction indicate the X direction and Y direction of the electric stage 20.

As illustrated in FIG. 18A, when, for example, the user performs a drag operation from a spot a5 to a spot a6 on functional area S_A_2, the X direction distance-component of the drag operation is XA_2 and the Y direction distance-component is YA_2. The user's drag operation from the spot a5 to the spot a6 is, for example, an operation performed by touching the spot a5 with a finger and moving it to the spot a6 without removing it from the touch panel 207. In this case, as illustrated in FIG. 18B, if the XY coordinate of the electric stage 20 before the drag operation is (X_0, Y_0), then the electric stage 20 will be controlled via the drag operation so that it moves to the XY coordinate(X_21, Y_21). Here, the value X_21 is XA_2 multiplied by 1$a$ with X_0 added to this product. The value Y_21 is YA_2 multiplied by 1$a$ with Y_0 added to this product. In other words, via the drag operation from the spot a5 to the spot a6 on functional area S_A_2, the electric stage 20 is controlled so that it moves the distance corresponding to XA_2 multiplied by 1$a$ in the X direction and so that it moves the distance corresponding to YA_2 multiplied by 1$a$ in the Y direction.

Figures 19A, 19B:
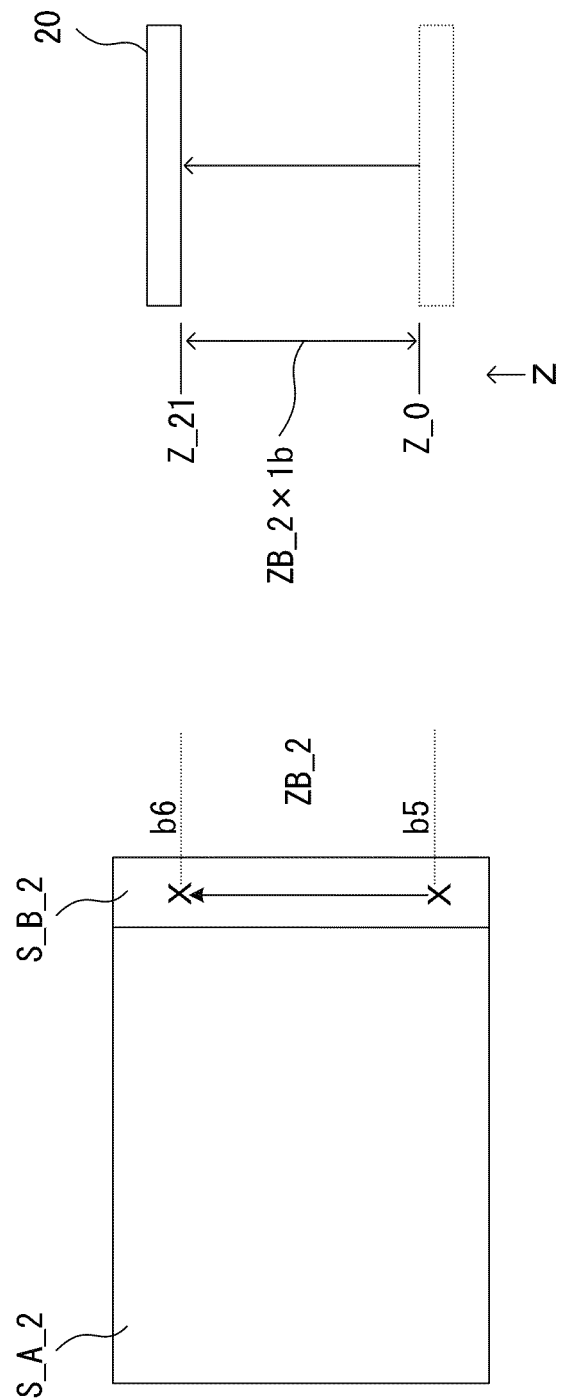
FIG. 19A is a diagram 1 illustrating a specific example of an operation that is performed when a user performs a drag operation on functional area S_B_2 in the display screen illustrated in FIG. 17; p
FIG. 19B is a diagram 2 illustrating a specific example of an operation that is performed when a user performs a drag operation on functional area S_B_2 in the display screen illustrated in FIG. 17.

FIG. 19 are each a diagram illustrating a specific example of an operation that is performed when a user performs a drag operation on functional area S_B_2 in the display screen illustrated in FIG. 17. FIG. 19A illustrates the display screen of the touch panel 207, and the vertical direction indicates the Y direction on the touch panel 207. FIG. 19B schematically illustrates the side surface of the electric stage 20, and the vertical direction indicates the Z direction of the electric stage 20.

As illustrated in FIG. 19A, when, for example, the user performs a drag operation from a spot b5 to a spot b6 on functional area S_B_2, the Y direction distance-component of the drag operation is ZB_2. The user's drag operation from the spot b5 to the spot b6 is, for example, an operation performed by touching the spot b5 with a finger and moving it to the spot b6 without removing it from the touch panel 207. In this case, as illustrated in FIG. 19B, if the Z coordinate of the electric stage 20 before the drag operation is Z_0, then the electric stage 20 will be controlled via the drag operation so that it moves to the Z coordinate Z_21. Here, the value Z_21 is ZB_2 multiplied by 1$b$ with Z_0 added to this product. In other words, via the drag operation from the spot b5 to the spot b6 on functional area S_B_2, the electric stage 20 is controlled so that it moves the distance corresponding to ZB_2 multiplied by 1$b$ in the direction in which the objective lens 23 and the electric stage 20 become closer to each other. In accordance with this operation, although not illustrated, the bar 501 in functional area S_B_2 moves to the position corresponding to Z coordinate Z_21, which is upward relative to the position it was at before the drag operation.

When, for example, the user performs in the process flow illustrated in FIG. 16 a drag operation from functional area S_A_2 to functional area S_B_2 or vice versa in the display screen illustrated in FIG. 17, the operations are performed as follows.

FIG. 20 are each a diagram illustrating a specific example of an operation that is performed when a user performs a drag operation from functional area S_A_2 to functional area S_B_2 in the display screen illustrated in FIG. 17. FIG. 20A illustrates the display screen of the touch panel 207, and the horizontal direction and vertical direction indicate the X direction and Y direction on the touch panel 207. FIG. 20B schematically illustrates the top surface of the electric stage 20, and the horizontal direction and vertical direction indicate the X direction and Y direction of the electric stage 20.

As illustrated in FIG. 20A, when, for example, the user performs a drag operation from a spot a7 on functional area S_A_2 to a spot a8 on functional area S_B_S, the X direction distance-component of the drag operation is XA_3 and the Y direction distance-component is YA_3. The user's drag operation from the spot a7 on functional area S_A_2 to the spot a8 on functional area S_B_S is, for example, an operation performed by touching the spot a7 with a finger and moving it to the spot a8 without removing it from the touch panel 207. In this case, as illustrated in FIG. 20B, if the XY coordinate of the electric stage 20 before the drag operation is (X_0, Y_0), then the electric stage 20 will be controlled via the drag operation so that it moves to the XY coordinate (X_31, Y_31). Here, the value X_31 is XA_3 multiplied by 1$a$ with X_0 added to this product. The value Y_31 is YA_3 multiplied by 1$a$ with Y_0 added to this product. In other words, via the drag operation from the spot a7 on functional area S_A_2 to the spot a8 on functional area S_B_2 on functional area S_B_2, the electric stage 20 is controlled so that it moves the distance corresponding to XA_3 multiplied by 1$a$ in the X direction and so that it moves the distance corresponding to YA_3 multiplied by 1$a$ in the Y direction. As described above, when a drag operation is started in functional area S_A_2 and is terminated in functional area S_B_2, the XY direction movement of the electric stage 20 corresponding to functional area S_A_2 on which the drag operation was started is controlled but the Z direction movement of the electric stage 20 is not controlled.

Figures 21A, 21B:
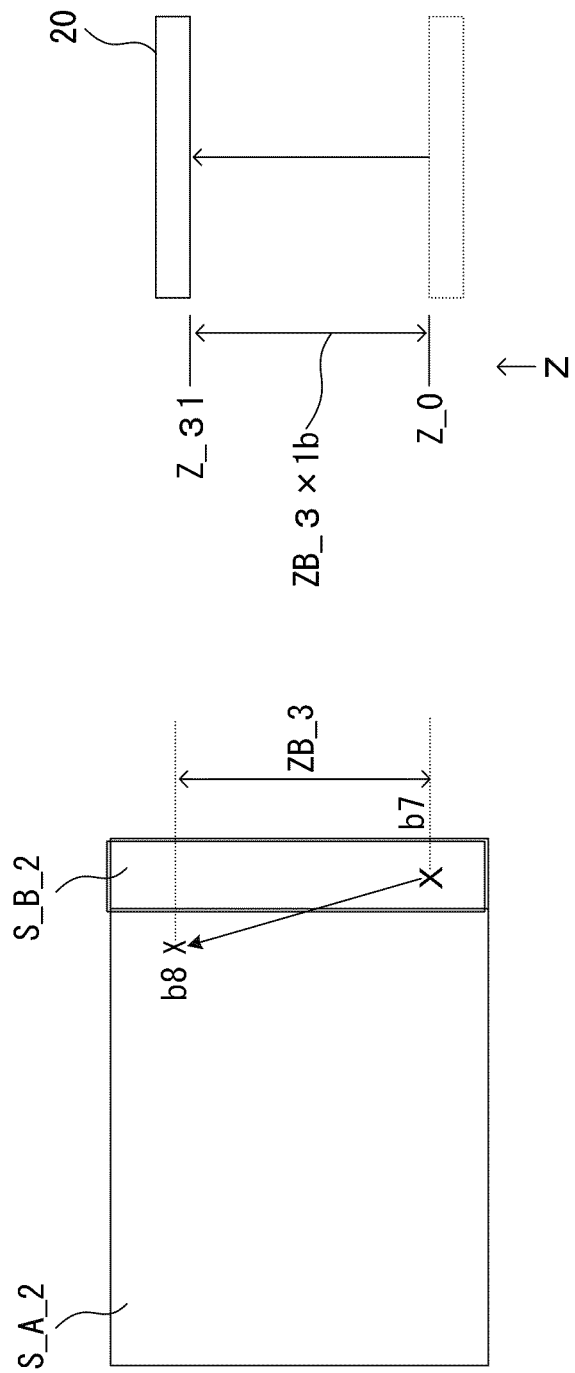
FIG. 21A is a diagram 1 illustrating a specific example of an operation that is performed when a user performs a drag operation from functional area S_B_2 to functional area S_A_2 in the display screen illustrated in FIG. 17.
FIG. 21B is a diagram 2 illustrating a specific example of an operation that is performed when a user performs a drag operation from functional area S_B_2 to functional area S_A_2 in the display screen illustrated in FIG. 17.

FIG. 21 are each a diagram illustrating a specific example of an operation that is performed when a user performs a drag operation from functional area S_B_2 to functional area S_A_2 in the display screen illustrated in FIG. 17. FIG. 21A illustrates the display screen of the touch panel 207, and the vertical direction indicates the Y direction on the touch panel 207. FIG. 21B schematically illustrates the side surface of the electric stage 20, and the vertical direction indicates the Z direction of the electric stage 20.

As illustrated in FIG. 21A, when, for example, the user performs a drag operation from a spot b7 on functional area S_B_2 to a spot b8 on functional area S_A_2, the Y direction distance-component of the drag operation is ZB_3. The user's drag operation from the spot b7 on functional area S_B_2 to the spot b8 on functional area S_A_2 is, for example, an operation performed by touching the spot b7 with a finger and moving it to the spot b8 without removing it from the touch panel 207. In this case, as illustrated in FIG. 21B, if the Z coordinate of the electric stage 20 before the drag operation is Z_0, then the electric stage 20 will be controlled via the drag operation so that it moves to the Z coordinate Z_31. Here, the value Z_31 is ZB_3 multiplied by 1$b$ with Z_0 added to this product. In other words, via the drag operation from the spot b7 on functional area S_B_2 to the spot b8 on functional area S_A_2, the electric stage 20 is controlled so that it moves the distance corresponding to ZB_3 multiplied by 1b in the direction in which the objective lens 23 and the electric stage 20 become closer to each other. In accordance with this operation, although not illustrated, the bar 501 in functional area S__2 moves to the position corresponding to Z coordinate Z_31, which is upward relative to the position it was at before the drag operation. As described above, when a drag operation is started in functional area S__2 and is terminated in functional area S_A_2, the Z direction movement of the electric stage 20 corresponding to functional area S__2 on which the drag operation was started is controlled but the XY direction movement of the electric stage 20 is not controlled.

Also in regard to FIGS. 18-21, for purposes of illustration, examples in which the movement of the electric stage 20 is controlled were described by focusing on the starting spot and finishing spot of a drag operation. In fact, however, as with the case in the operations performed during the normal functional area mode, the electric stage 20 is not controlled to move at one stroke after the drag operation is finished but the movement of the electric stage 20 is controlled so that it continuously follows the drag operation. Both coefficients 1a and 1b used for the movement control of the electric stage 20 via such a drag operation do not need to be fixed but can be variable. In this case, as an example, coefficients 1a and 1b can be variable in accordance with the objective lens 23 used.

The operations performed when a drag operation is performed from one functional area to another functional area as described using FIGS. 20 and 21 can also be performed similarly in the display screen before enlargement of a functional area during the enlarged functional area mode and in the display screen during the normal functional area mode (e.g., the display screen illustrated in FIG. 5). In this case, when a drag operation is performed from functional area S_A to another functional area or when a drag operation is performed from functional area S_B to another functional area, control is performed in accordance with the functional area in which the drag operation was started.

Figure 22:
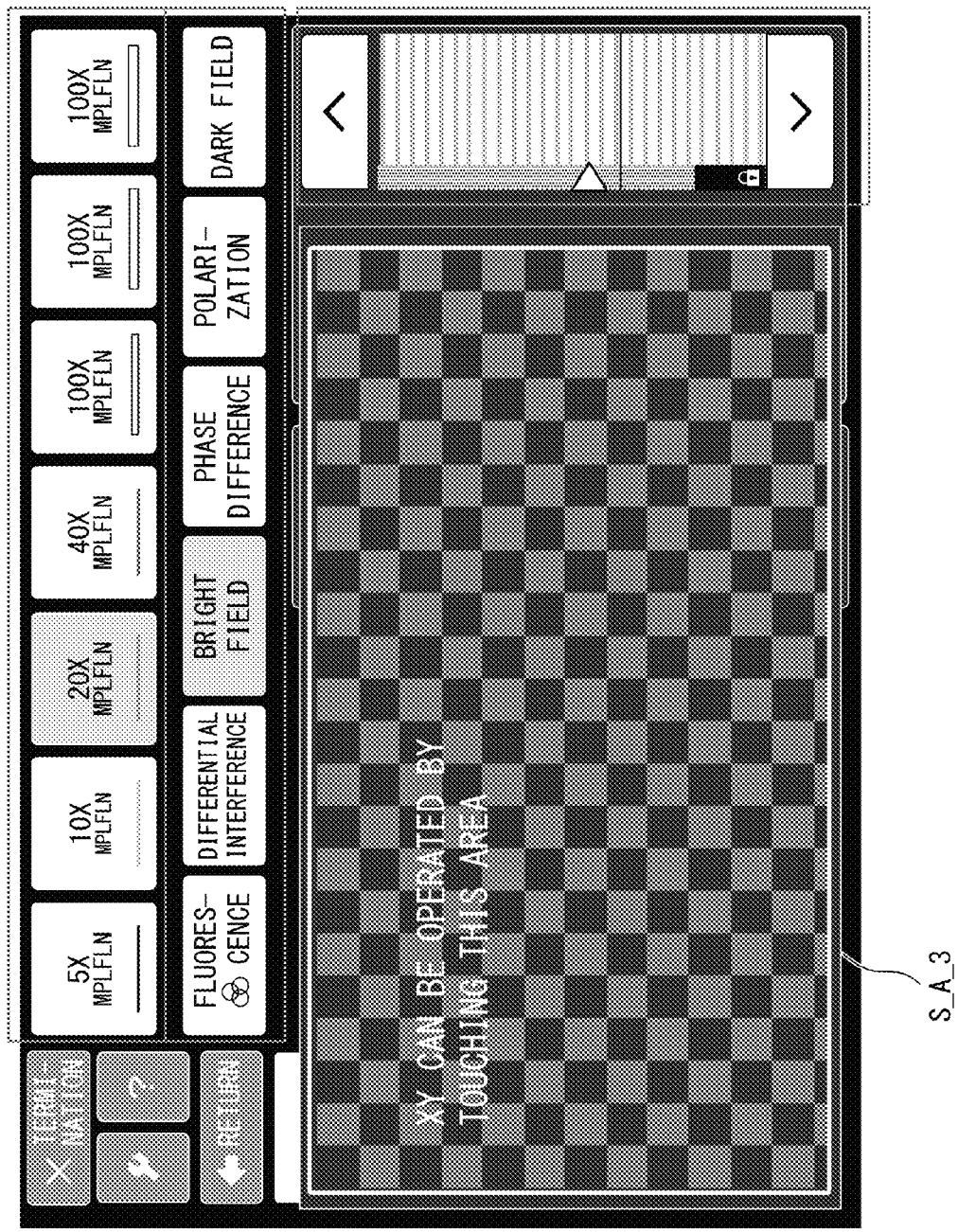
FIG. 22 is a diagram illustrating an example of the display screen of the touch panel which is indicated when only functional area S_A is enlarged.

In regard to the present embodiment, as indicated by functional areas S_A_2 and S__2 in the display screen illustrated in FIG. 17, examples were indicated in which, during the enlarged functional area mode, functional area S_A for making operable the electric unit for moving the electric stage 20 in the XY direction and functional area S_B for making operable the electric unit for moving the electric stage 20 in the Z direction are enlarged. However, the combination of enlarged functional areas is not limited to being the combination of functional areas S_A and S_B but can also be the combination of other functional areas. As an example, when there is an input to functional area S_A in the display screen before enlargement of a functional area, only functional area S_A may be enlarged as with functional area S_A_3 in the display screen illustrated in FIG. 22.

As described above, according to the present embodiment, the microscope controller 2 has two operation modes, i.e., the normal functional area mode and an enlarged functional area mode; therefore, the size of some functional areas can be varied by switching an operation mode to be used depending on the situation. Therefore, even in a narrow and limited operation area such as a touch panel, the size of a functional area on which a drag operation is performed (i.e., functional areas for moving the electric stage 20 in the XY direction and Z direction) can be enlarged by switching the operation mode to the enlarged functional area mode. Therefore, input can be performed with a longer operation stroke and operations can be performed without looking at the screen, thereby improving the operability.

[Second Embodiment]

The configuration of the microscope system according to the second embodiment of the present invention is different from that of the microscope system according to the first embodiment described above in the sense that the nonvolatile memory 205 of the microscope controller 2 further records, as a table, specific operation information which will be described later. Operations performed by the microscope system according to the second embodiment during the enlarged functional area mode are partly different from those performed by the microscope system according to the first embodiment described above during the enlarged functional area mode. Accordingly, the second embodiment will be described by mainly focusing on the differences. Since the other configurations and operations are the same as those of the microscope system according to the first embodiment, they are not described herein.

Figure 24:
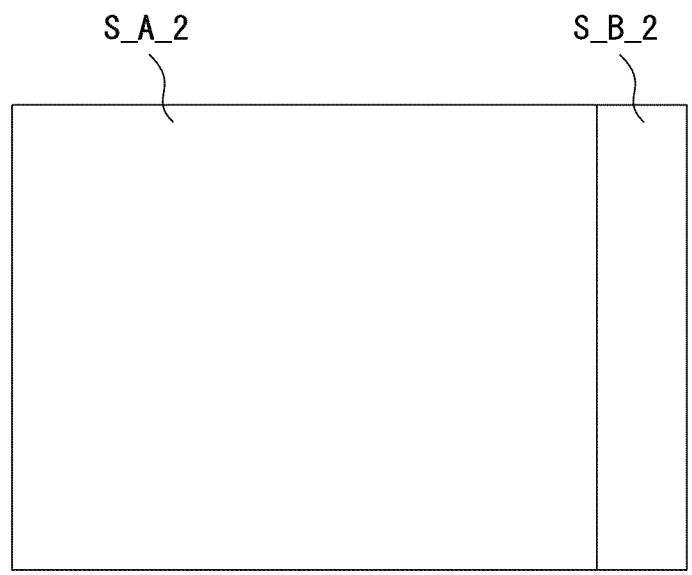
FIG. 24 is a diagram 1 illustrating an example of a plurality of input areas established in advance in a display region of a touch panel of the microscope controller according to the second embodiment.
Figure 25:
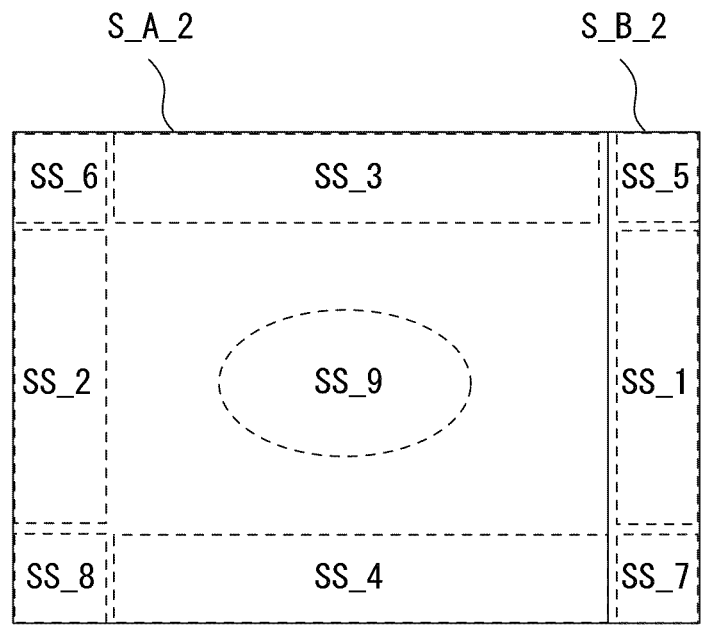
FIG. 25 is a diagram 2 illustrating an example of a plurality of input areas established in advance in the display region of the touch panel of the microscope controller according to the second embodiment.

FIG. 23 is a diagram illustrating an example of specific operation information recorded as a table in the nonvolatile memory 204 of the microscope controller 2 according to the present embodiment. FIGS. 24 and 25 are each a diagram illustrating an example of a plurality of input areas established in advance in the display region of the touch panel 207 of the microscope controller 2.

As illustrated in FIG. 23, for each input area established in advance in the display area of the touch panel 207, specific operation information recorded by the nonvolatile memory 204 defines an ID (identification), a specific operation associated with the input area, a driven part (electric unit) controlled via the specific operation, a control to be performed for the driven part, and permission/prohibition of the control. In other words, only the specific operation of an ID for which permission is defined is valid. The user can optionally change the combination of an area, a specific operation, a driven part controlled via the specific operation, the control to be performed, and permission/prohibition of the control, and also can optionally define new content.

The plurality of input areas established in advance in the display area of the touch panel 207 are composed of eleven input areas, i.e., two input areas illustrated in FIG. 24 and nine input areas surrounded by dotted lines illustrated in FIG. 25. The two input areas illustrated in FIG. 24 are input areas corresponding to functional areas S_A_2 and S__2. The nine input areas illustrated in FIG. 25 are input areas SS_1, SS_2, SS_3 and SS_4 provided along the four sides of the touch panel 207, input areas SS_5, SS_6, SS_7 and SS_8 provided at the four corners of the touch panel 207, and input area SS_9 provided at the center of the touch panel 207.

As described above, if specific operation information is recorded in advance in the nonvolatile memory 204 and if a plurality of input areas are established in advance in the display region of the touch panel 207, driven parts can also be controlled via the specific operations, which are defined by the specific operation information, being performed as will be described later in detail.

Figure 26:
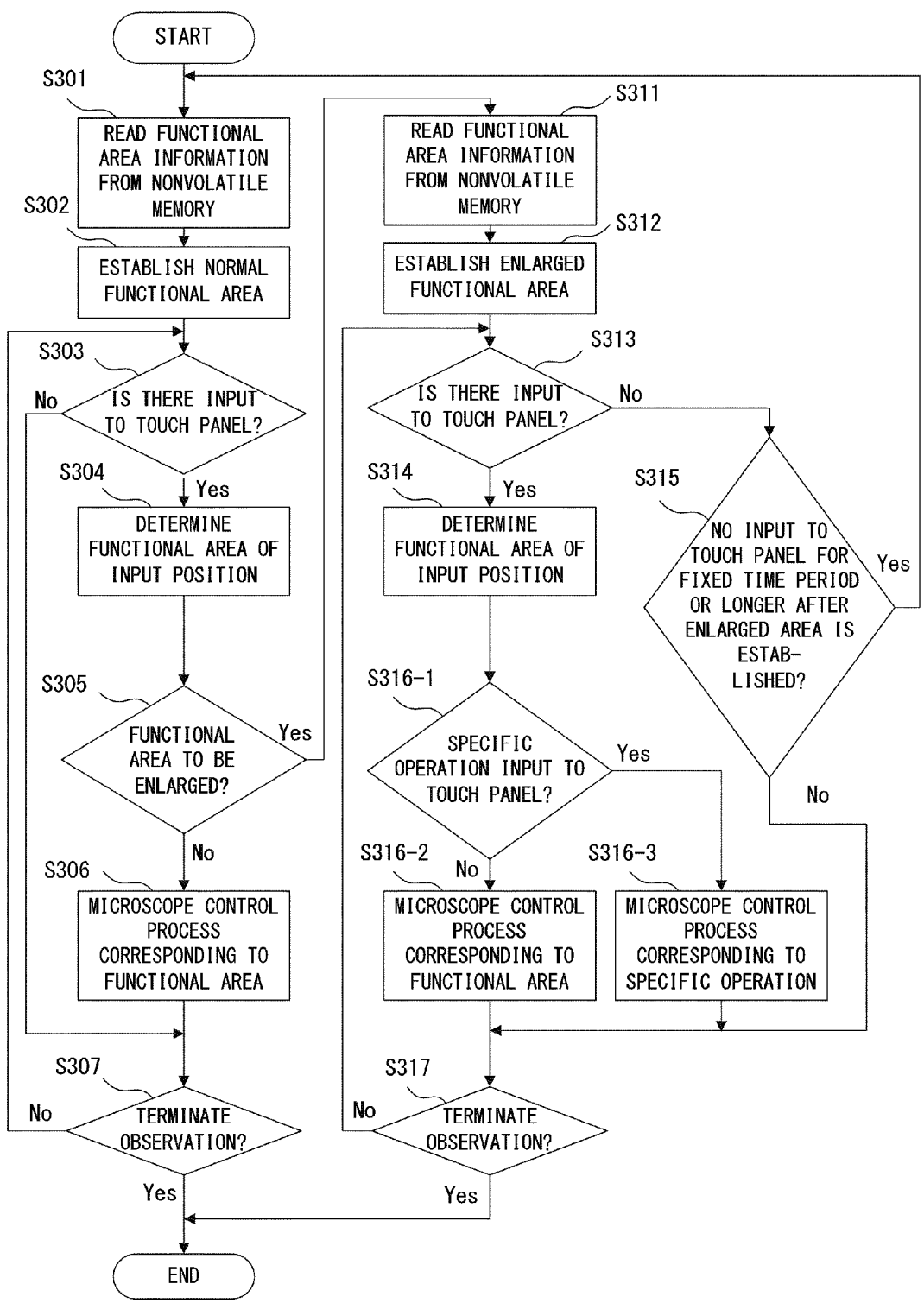
FIG. 26 is a diagram illustrating an example of a process flow relating to an operation of the microscope controller which is performed when an operation mode is an enlarged functional area mode in a microscope system according to the second embodiment.

FIG. 26 is a diagram illustrating an example of a process flow relating to an operation of the microscope controller 2 which is performed when the operation mode is the enlarged functional area mode in the microscope system according to the second embodiment. This process flow corresponds to the process flow illustrated in FIG. 16. This process flow is also implemented via the CPU 201, which serves as a control unit of the microscope controller 2, reading and executing a control program recorded by the ROM 202.

The process flow illustrated in FIG. 26 is the same as the process flow illustrated in FIG. 16 except that the process of S316 illustrated in FIG. 16 is replaced with the processes of S316_1, S316_2 and S316_3. Accordingly, here, these replaced processes are mainly described and the other processes are not described.

As illustrated in FIG. 26, when it is determined in S314 which functional area an input to the touch panel 207 corresponds to, it is determined in the following step, S316_1, whether or not the input, which was determined in S313 to be the input to the touch panel 207, is an input that was performed via a specific operation defined by the specific operation information recorded by the nonvolatile memory 204.

When the determination result of S316_1 is Yes, a control process corresponding to the specific operation (i.e., control process for a driven part (electric unit)) is performed in the following step, S316_3, on the basis of the specific operation information recorded by the nonvolatile memory 204.

Meanwhile, when the determination result of S316_1 is No, the control process corresponding to the functional area determined in S314 is performed in the following step, S316_2, as with the case in S316 illustrated in FIG. 16.

Then, after S316_3 or S316_2, the process proceeds to S317.

According to this process flow, when, for example, a user performs an input to the display screen illustrated in FIG. 17 by performing a specific operation, the following operations are specifically performed.

Figure 27B:
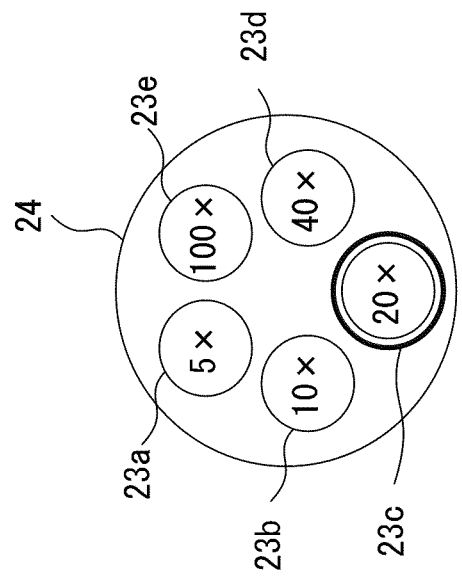
FIG. 27B is a diagram 1_2 illustrating a specific example of an operation which is performed when a user performs an input in a circular motion within the fixed time period T1 on functional area S_A_2 in the display screen indicated in FIG. 17 (FIG. 24)
Figure 27A:
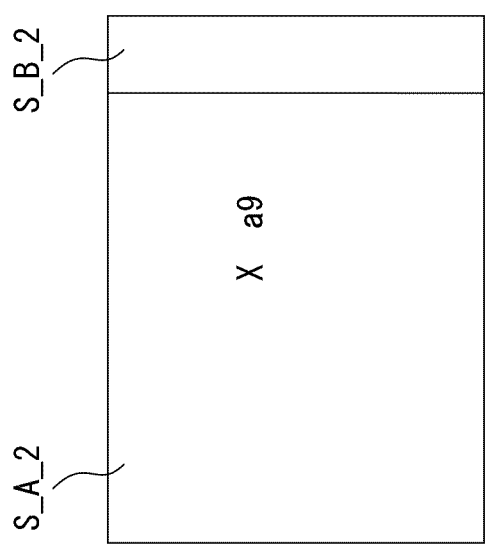
FIG. 27A is a diagram 1_1 illustrating a specific example of an operation which is performed when a user performs an input in a circular motion within a fixed time period T1 on functional area S_A_2 in the display screen indicated in FIG. 17 (FIG. 24)
Figure 28B:
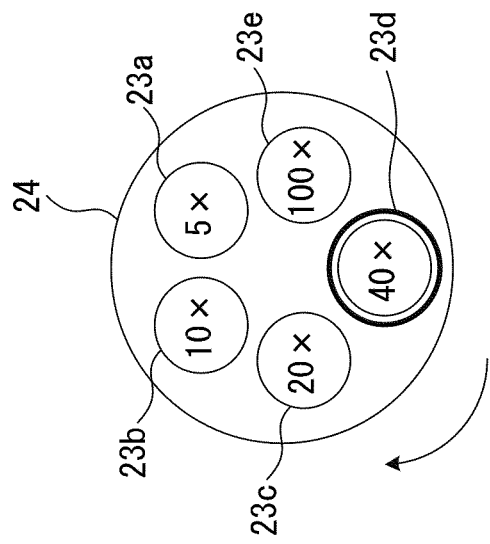
FIG. 28B is a diagram 2_2 illustrating a specific example of an operation which is performed when a user performs an input in a circular motion within the fixed time period T1 on functional area S_A_2 in the display screen indicated in FIG. 17 (FIG. 24)
Figure 28A:
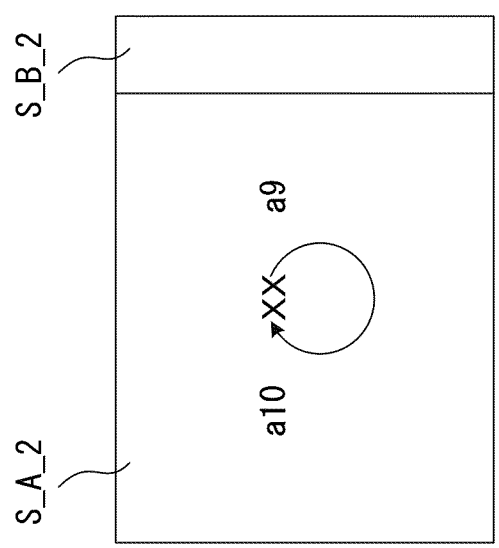
FIG. 28A is a diagram 2_1 illustrating a specific example of an operation which is performed when a user performs an input in a circular motion within the fixed time period T1 on functional area S_A_2 in the display screen indicated in FIG. 17 (FIG. 24)
Figure 29B:
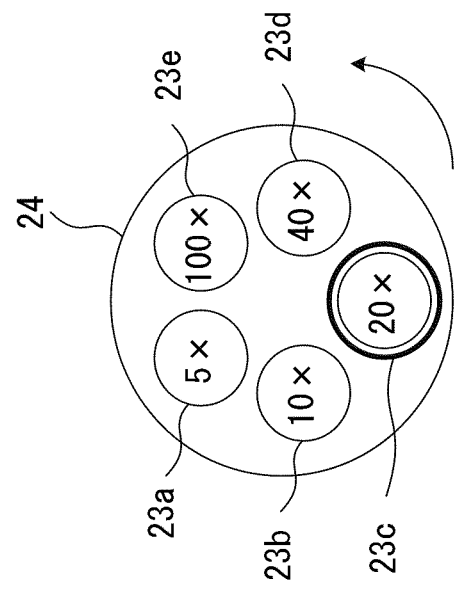
FIG. 29B is a diagram 3_2 illustrating a specific example of an operation which is performed when a user performs an input in a circular motion within the fixed time period T1 on functional area S_A_2 in the display screen indicated in FIG. 17 (FIG. 24)
Figure 29A:
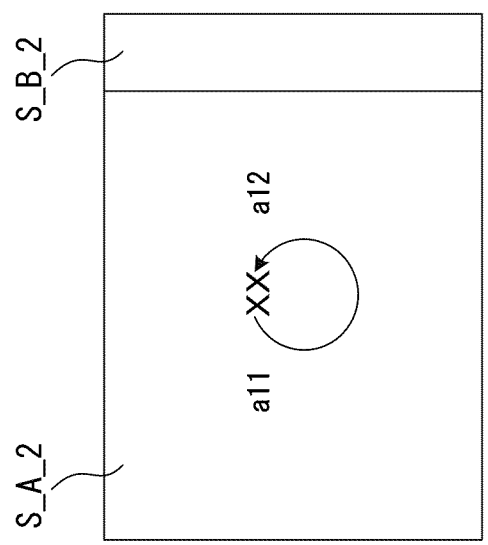
FIG. 29A is a diagram 3_1 illustrating a specific example of an operation which is performed when a user performs an input in a circular motion within the fixed time period T1 on functional area S_A_2 in the display screen indicated in FIG. 17 (FIG. 24)

FIGS. 27, 28 and 29 are each a diagram illustrating a specific example of an operation which is performed when a user performs an input in a circular motion within a fixed time period T1 on functional area S_A_2 in the display screen indicated in FIG. 17 (FIG. 24). FIGS. 27A, 28A and 29A each show the display screen of the touch panel 207. FIGS. 27A, 28A and 29A each illustrate the display screen of the touch panel 207. FIGS. 27B, 28B and 29B each schematically illustrate the switching position of the electric revolver 24 mounted with a plurality of objective lenses 23, and the objective lens indicated using a thick line is the one inserted in the observation light path. Assume that also in the present embodiment, an objective lens 23a with a 5-fold magnification (5×), an objective lens 23b with a 10-fold magnification (10×), an objective lens 23c with a 20-fold magnification (20×), an objective lens 23d with a 40-fold magnification (40×), and an objective lens 23e with a 100-fold magnification (100×) are mounted in the electric revolver 24 as a plurality of objective lenses 23. Also assume that the objective lens 23c with a 20-fold magnification is inserted in the observation light path as illustrated in FIG. 27B.

When, for example, a user performs, on functional area S_A_2, an input as illustrated in FIGS. 27A and 28A in which approximately a circle connecting a spot a9 to a spot a10 is traced in a clockwise direction within the fixed time period T1, this input is determined to be an input performed via the specific operation of ID01 defined by the specific operation information illustrated in FIG. 23. Then, an instruction is given to the microscope control unit 31 to control the rotation of the electric revolver 24 so that an objective lens with a higher magnification is inserted in the observation light path. As a result of this, the electric revolver 24 is rotated as illustrated in FIG. 28B so as to switch the objective lens inserted in the observation light path from the objective lens 23c with a 20-fold magnification to the objective lens 23d with a 40-fold magnification.

After an input is performed as described above in which approximately a circle is traced in a clockwise direction, when, for example, a user performs, on functional area S_A_2, an input as illustrated in FIG. 29A in which approximately a circle connecting a spot a11 to a spot a12 is traced in a counterclockwise direction within the fixed time period T1, this input is determined to be an input performed via the specific operation of ID02 defined by the specific operation information illustrated in FIG. 23. Then, an instruction is given to the microscope control unit 31 to control the rotation of the electric revolver 24 so that an objective lens with a lower magnification is inserted in the observation light path. As a result of this, the electric revolver 24 is rotated as illustrated in FIG. 29B so as to switch the objective lens inserted in the observation light path from the objective lens 23d with a 40-fold magnification to the objective lens 23c with a 20-fold magnification.

Figure 30B:
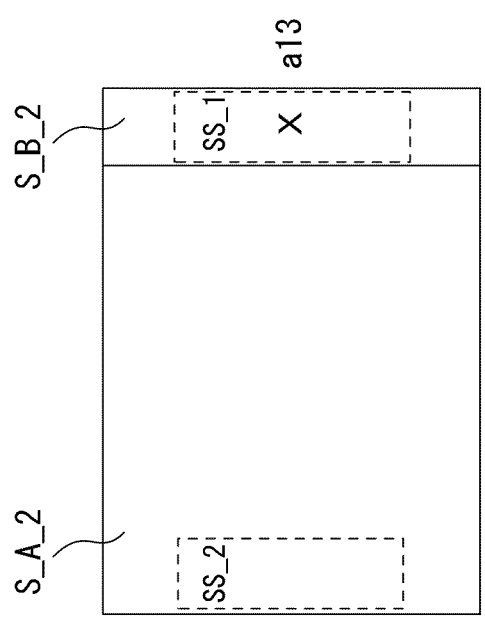
FIG. 30B is a diagram 1_2 illustrating a specific example of an operation which is performed when a user performs an input via two touch operations within the fixed time period T2 at the same position in input area SS_1 or SS_2 in the display screen indicated in FIG. 17 (FIG. 25)
Figure 30A:
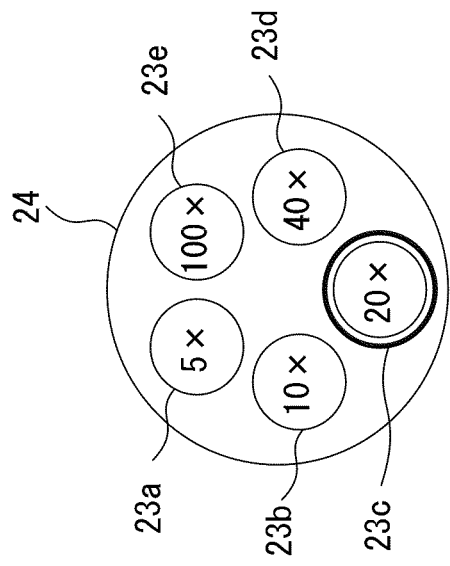
FIG. 30A is a diagram 1_1 illustrating a specific example of an operation which is performed when a user performs an input via two touch operations within a fixed time period T2 at the same position in input area SS_1 or SS_2 in the display screen indicated in FIG. 17 (FIG. 25)
Figure 32B:
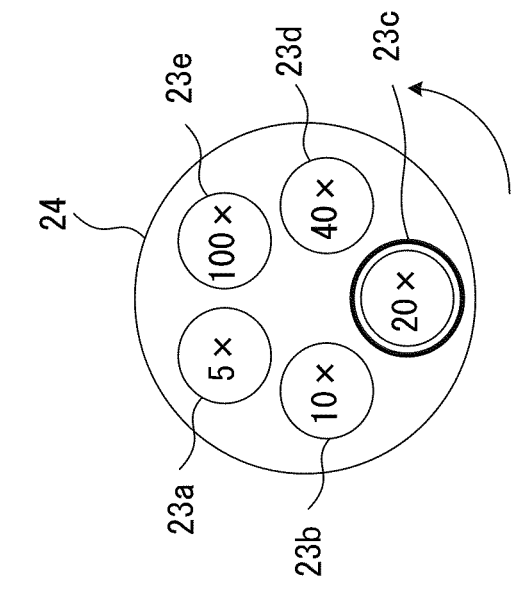
FIG. 32B is a diagram 3_2 illustrating a specific example of an operation which is performed when a user performs an input via two touch operations within the fixed time period T2 at the same position in input area SS_1 or SS_2 in the display screen indicated in FIG. 17 (FIG. 25)
Figure 32A:
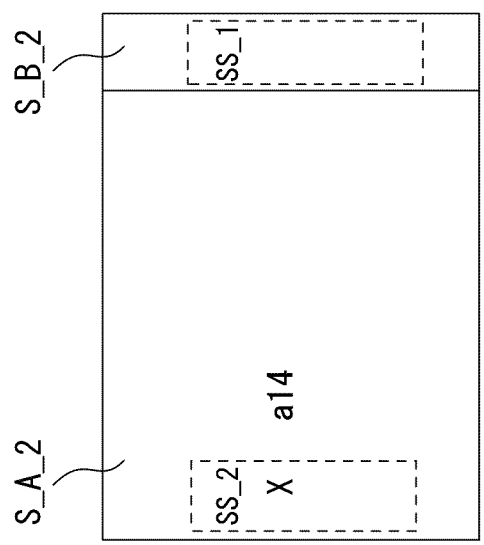
FIG. 32A is a diagram 3_1 illustrating a specific example of an operation which is performed when a user performs an input via two touch operations within the fixed time period T2 at the same position in input area SS_1 or SS_2 in the display screen indicated in FIG. 17 (FIG. 25)

FIGS. 30, 31 and 32 are each a diagram illustrating a specific example of an operation which is performed when a user performs input via two touch operations within a fixed time period T2 to the same position in input area SS_1 or SS_2 in the display screen indicated in FIG. 17 (FIG. 25). FIGS. 30A, 31A and 32A each illustrate the display screen of the touch panel 207. FIGS. 30B, 31B and 32B each schematically illustrate the switching position of the electric revolver 24 mounted with a plurality of objective lenses 23, and the objective lens indicated using a thick line is the one inserted in the observation light path. Here, assume that the objective lens 23c with a 20-fold magnification is inserted in the observation light path as illustrated in FIG. 30B.

When, for example, a user performs an input to a spot a13 on input area SS_1 within the fixed time period T2 via two touch operations as illustrated in FIGS. 30A and 31A, this input is determined to be an input performed via the specific operation of ID03 defined by the specific operation information illustrated in FIG. 23. Then, an instruction is given to the microscope control unit 31 to control the rotation of the electric revolver 24 so that an objective lens with a higher magnification is inserted in the observation light path. As a result of this, the electric revolver 24 is rotated as illustrated in FIG. 31B so as to switch the objective lens inserted in the observation light path from the objective lens 23c with a 20-fold magnification to the objective lens 23d with a 40-fold magnification.

When, for example, a user performs an input to a spot a14 on functional area SS_2 within the fixed time period T2 via two touch operations as illustrated in FIG. 32A after the input was performed via two touch operations as described above, this input is determined to be an input performed via the specific operation of ID04 defined by the specific operation information illustrated in FIG. 23. Then, an instruction is given to the microscope control unit 31 to control the rotation of the electric revolver 24 so that an objective lens with a lower magnification is inserted in the observation light path. As a result of this, the electric revolver 24 is rotated as illustrated in FIG. 32B so as to switch the objective lens inserted in the observation light path from the objective lens 23d with a 40-fold magnification to the objective lens 23c with a 20-fold magnification.

FIGS. 33 and 34 are each a diagram illustrating a specific example of an operation which is performed when a user performs an input via two touch operations within the fixed time period T2 to the same position in input area SS_3 or SS_4 in the display screen indicated in FIG. 17 (FIG. 25). FIGS. 33 and 34 each illustrate the display screen of the touch panel 207.

When, for example, a user performs an input to a spot a15 on input area SS_3 within the fixed time period T2 via two touch operations as illustrated in FIG. 33, this input is determined to be an input performed via the specific operation of ID05 defined by the specific operation information illustrated in FIG. 23. Then, an instruction is given to the microscope control unit 31 to control the light source (i.e., the transmitted illumination light source 6 or the epi-illumination light source 13) so that light quantity is increased. As a result of this, the light quantity from the light source increases.

When, for example, a user performs an input to a spot a16 on functional area SS_4 within the fixed time period T2 via two touch operations as illustrated in FIG. 34 after the input was performed via two touch operations as described above, this input is determined to be an input performed via the specific operation of ID06 defined by the specific operation information illustrated in FIG. 23. Then, an instruction is given to the microscope control unit 31 to control the light source (i.e., the transmitted illumination light source 6 or the epi-illumination light source 13) so that light quantity is decreased. As a result of this, the light quantity from the light source decreases.

In the present embodiment, an input performed via a specific operation is accepted by the display screen (e.g., the display screen illustrated in FIG. 17) after enlargement of a functional area. As an example, however, the configuration can also be made such that the display screen before enlargement of a functional area in the enlarged functional area mode and the display screen in the normal functional area mode (e.g., the display screen illustrated in FIG. 5) similarly accept an input performed via a specific operation.

Figure 35:
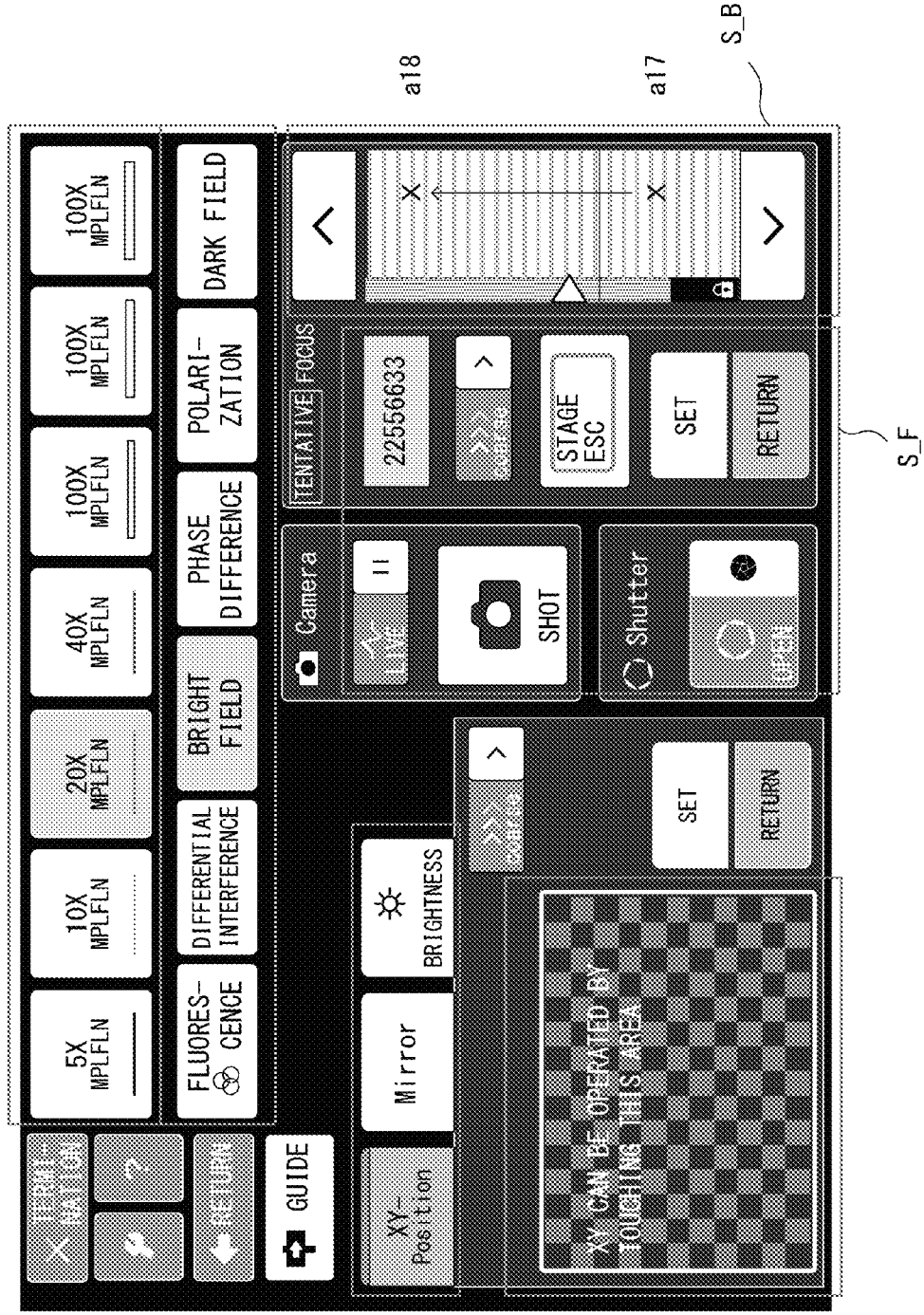
FIG. 35 is a diagram 1 illustrating an operation which is performed when drag operations are repeatedly performed on functional area S_B and when some of the drag operations mistakenly deviate to another functional area.

In the present embodiment, when, for example, a drag operation is repeatedly performed as illustrated in FIG. 35 from a spot a17 to a spot a18 on functional area S_B in the display screen in the normal functional area mode, the drag operation may mistakenly deviate to another functional area as illustrated in, for example, FIG. 36 in which a drag operation is performed from a spot a17' to a spot a18' on functional area S_F. In such a case, since the drag operation from the spot a17' to the spot a18' on functional area S_F is also a portion of the drag operation above repeatedly performed, processes can also be performed on the assumption that the drag operation from the spot a17' to the spot a18' is also a drag operation performed on functional area S_B. Such processes can also be performed on the display screen after enlargement of a functional area during the enlarged functional area mode, which is illustrated in, for example, FIG. 17.

As described above, according to the present embodiment, using specific operation information recorded as a table in the nonvolatile memory 204 of the microscope controller 2, inputs performed via specific operations on the touch panel 207 can be assigned as operations of microscope parts. Therefore, even in a narrow and limited operation area such as a touch panel, operations can be performed without looking at the operation area. By assigning specific operations peculiar to a microscope apparatus, such as switching of an objective lens and a microscopic examination method, operability of other microscope parts, including movement of an electric stage, can be improved.

Embodiments of the present invention have been described; however, it should be noted that embodiments of the present invention are not limited to those described above and that various modifications and changes can be made without departing from the spirit of the present invention.

As an example, although an upright microscope apparatus is employed as a microscope apparatus in the microscope system according to each of the embodiments described above, the microscope apparatus to be used is not limited to being upright; therefore, an inverted microscope apparatus can also be employed. The present embodiment can also be applied to various systems, such as a line apparatus incorporating a microscope apparatus.

In the microscope systems according to the embodiments described above, as electric units that can be operated via the touch panel, a combination of publicly known electric units not including the electric units described above can also be employed. As an example, the combination of an electric unit for driving an FS (field stop), an electric unit for driving an AS (aperture stop), and the like can also be employed.

In the microscope systems according to the embodiments described above, an objective lens inserted in an observation light path is switched via a revolver with a plurality of objective lenses being rotated. Of course, instead of this configuration, an objective lens provided with a zoom function can also be employed.

In the microscope systems according to the embodiments described above, a microscope controller having a touch panel is employed. However, the touch panel can be replaced with a device provided with a function equivalent to that of the touch panel.

As described above, the present invention can improve the user operability of a microscope.

What is claimed is:

1. A microscope controller which controls an operation of each of a plurality of electric units included in a microscope system, the microscope controller comprising:
   a touch panel unit which receives an input provided by a physical contact from outside and which has a display function;
   a control unit which establishes a plurality of functional areas within a display region of the touch panel unit as regions for operating each of the plurality of electric units, and which generates a control instruction signal for controlling a corresponding one of the plurality of electric units when an input provided by a physical contact from outside to any of the plurality of functional areas is detected; and
   a communication control unit which transmits the control instruction signal generated by the control unit to an external device that controls an operation of the corresponding electric unit,
   wherein when a first input provided by a physical contact from outside to a predetermined functional area of the plurality of functional areas is detected, the control unit reestablishes a plurality of the functional areas within the display region of the touch panel unit so as to enlarge the predetermined functional area or so as to enlarge a plurality of specific functional areas including the predetermined functional area, and
   wherein when a second input provided by a physical contact from outside to any of the reestablished plurality of functional areas is detected, the control unit generates a control instruction signal for controlling an electric unit corresponding to the functional area with respect to which the second input is detected.

2. The microscope controller according to claim 1, wherein the predetermined functional area enlarged via the reestablishing is a functional area that, when the physical contact from outside to the predetermined functional area is made by a drag operation, enables an operation for causing an electric unit corresponding to the predetermined functional area to be continuously operated in conjunction with the drag operation.

3. The microscope controller according to claim 1, wherein the plurality of specific functional areas are enlarged via the reestablishing and include a functional area for operating an electric unit for moving a sample or an objective lens in an optical axis direction of a stage, and a functional area for operating an electric unit for moving the sample or the objective lens in a direction perpendicular to the optical axis direction of the stage.

4. The microscope controller according to claim 1, wherein the plurality of functional areas established or reestablished in the display region of the touch panel unit include at least one of a functional area for operating an electric unit for moving a sample or an objective lens in an optical axis direction of a stage, a functional area for operating an electric unit for moving the sample or the objective lens in a direction perpendicular to the optical axis direction of the stage, a functional area for operating an electric unit for switching a lighting control quantity of a light source, a functional area for operating an electric unit for switching an optical magnification, a functional area for operating an electric unit for switching a position of an optical element turret, and a functional area for operating an electric unit for switching a microscopic examination method.

5. The microscope controller according to claim 1, wherein the plurality of functional areas established or reestablished in the display region of the touch panel unit include a given functional area in which when a physical contact from outside is made by a drag operation, a corresponding electric unit is continuously operated in conjunction with the drag operation, and
wherein when the physical contact from outside starting in the given functional area is made by the drag operation and when the physical contact made by the drag operation continues to another functional area, the control unit generates a control instruction signal for controlling only the electric unit corresponding to the given functional area in which the physical contact made by the drag operation was started.

6. The microscope controller according to claim 1, wherein of the plurality of functional areas established or reestablished in the display region of the touch panel unit, when an input provided by a physical contact from outside is detected in a certain functional area, which is a functional area in which if the physical contact from outside is provided by a drag operation, a corresponding electric unit is continuously operated in conjunction with the drag operation, the control unit generates a control instruction signal for controlling an electric unit corresponding to the certain functional area based on a position at which the physical contact stops.

7. The microscope controller according to claim 1, wherein when an input provided by a physical contact from outside to the display region of the touch panel unit is detected, the control unit determines whether or not the physical contact is in accordance with a specific operation defined in advance, and
wherein when it is determined that the physical contact is in accordance with the specific operation, the control unit generates a control instruction signal for controlling an electric unit corresponding to the specific operation.

8. The microscope controller according to claim 7, wherein the specific operation includes an operation in which a same position on a predetermined region established within the display region of the touch panel unit is touched two times consecutively within a fixed time period.

9. The microscope controller according to claim 7, wherein the specific operation includes an operation in which a physical contact made by a drag operation is performed in a circular motion on a predetermined region established in the display region of the touch panel unit within a fixed time period.

10. The microscope controller according to claim 7, wherein in accordance with the specific operation, the control unit generates the control instruction signal for controlling one of an electric unit for switching a lighting control quantity of a light source, an electric unit for switching an optical magnification, an electric unit for switching an optical element turret position, and an electric unit for switching a microscopic examination method.

11. The microscope controller according to claim 7, wherein the specific operation and one of the plurality of electric units corresponding to the specific operation, are determined by a user in advance.

12. A microscope system comprising the microscope controller according to claim 1.

13. An electric unit controlling method for a microscope controller which controls an operation of each of a plurality of electric units included in a microscope system, wherein the microscope controller comprises a touch panel unit which receives an input provided by a physical contact from outside and which has a display function, the method comprising:
establishing a plurality of functional areas in a display region of the touch panel unit as regions for operating each of the plurality of electric units;
when a first input provided by a physical contact from outside to a predetermined functional area of the plurality of functional areas is detected, reestablishing a plurality of the functional areas within the display region of the touch panel unit so as to enlarge the predetermined functional area or so as to enlarge a plurality of specific functional areas including the predetermined functional area;
when a second input provided by a physical contact from outside to any of the reestablished plurality of functional areas is detected, generating a control instruction signal for controlling an electric unit corresponding to the functional area with respect to which the second input is detected; and
transmitting the control instruction signal to an external device that controls an operation of the electric unit corresponding to the functional area with respect to which the second input is detected.

14. The electric unit controlling method according to claim 13, further comprising:
when an input provided by a physical contact from outside to the display region of the touch panel unit is detected, determining whether or not the physical contact is in accordance with a specific operation defined in advance;
when it is determined that the physical contact is in accordance with the specific operation defined in advance, generating a control instruction signal for controlling an electric unit corresponding to the specific operation; and
transmitting the control instruction signal to the external device that controls an operation of the electric unit corresponding to the specific operation.

15. A microscope system comprising the microscope controller according to claim 2.

16. A microscope system comprising the microscope controller according to claim 3.

17. A microscope system comprising the microscope controller according to claim 4.

18. A microscope system comprising the microscope controller according to claim 5.

19. A microscope system comprising the microscope controller according to claim 6.

* * * * *